United States Patent
Asplund et al.

(10) Patent No.: US 11,224,039 B2
(45) Date of Patent: Jan. 11, 2022

(54) SYSTEMS AND METHODS OF SHARING CHANNEL INFORMATION BETWEEN CO-LOCATED RADIO NODES

(71) Applicant: Telefonaktiebolaget LM Ericsson (publ), Stockholm (SE)

(72) Inventors: Henrik Asplund, Stockholm (SE); Jonas Medbo, Uppsala (SE); Peter Ökvist, Luleå (SE); Mathias Riback, Täby (SE); Arne Simonsson, Gammelstad (SE); Paul Mihkel Teder, Täby (SE); Magnus Thurfjell, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 106 days.

(21) Appl. No.: 16/344,498

(22) PCT Filed: Oct. 31, 2017

(86) PCT No.: PCT/SE2017/051068
§ 371 (c)(1),
(2) Date: Apr. 24, 2019

(87) PCT Pub. No.: WO2018/080390
PCT Pub. Date: May 3, 2018

(65) Prior Publication Data
US 2019/0246394 A1    Aug. 8, 2019

Related U.S. Application Data

(60) Provisional application No. 62/415,497, filed on Oct. 31, 2016.

(51) Int. Cl.
H04W 72/04    (2009.01)
H04L 25/02    (2006.01)
(Continued)

(52) U.S. Cl.
CPC ....... *H04W 72/0426* (2013.01); *H04L 1/0026* (2013.01); *H04L 25/0202* (2013.01);
(Continued)

(58) Field of Classification Search
None
See application file for complete search history.

(56) References Cited

U.S. PATENT DOCUMENTS

2011/0244847 A1* 10/2011 Mallik ................ H04B 7/0626
455/422.1
2011/0299488 A1  12/2011 Kim et al.
(Continued)

FOREIGN PATENT DOCUMENTS

WO    2015094045 A1    6/2015

OTHER PUBLICATIONS

Heneda, K. et al., "Measurement Results and Final Channel Models for Preferred Suitable Frequency Ranges", May 12, 2017, pp. 1-253, Deliverable D2.2, Project No. ICT-671650, mm MAGIC, obtained from internet: https://bscw.5g-mmmagic.eu/pub/bscw.cgi/d202656/mmMAGIC_D2-2.pdf.

*Primary Examiner* — Jutai Kao
(74) *Attorney, Agent, or Firm* — Coats & Bennett, PLLC

(57) ABSTRACT

Systems and methods of sharing channel information between co-located radio nodes are provided. In one exemplary embodiment, a method performed by a second radio node (111, 200, 300*a, b,* 1111) of sharing channel information between a first radio node (101, 500, 600*a, b,* 1101) and the second radio node that are co-located (107) may include obtaining (403), by the second radio node, first channel information characterizing a communication channel (105*a-c*) between a third radio node (121, 1121) and the first radio node in a first frequency band. Further, the method may include using (405), by the second radio node, the first
(Continued)

channel information for communication with the third radio node or a fourth radio node (123) in a second frequency band.

16 Claims, 24 Drawing Sheets

(51) Int. Cl.
    *H04L 1/00*         (2006.01)
    *H04W 36/00*      (2009.01)
    *H04W 36/30*      (2009.01)
    *H04W 36/38*      (2009.01)
    *H04W 56/00*      (2009.01)
    *H04W 74/00*      (2009.01)

(52) U.S. Cl.
    CPC ....... *H04W 36/0044* (2013.01); *H04W 36/30* (2013.01); *H04W 36/38* (2013.01); *H04W 56/001* (2013.01); *H04W 72/046* (2013.01); *H04W 74/002* (2013.01)

(56) References Cited

U.S. PATENT DOCUMENTS

| | | |
|---|---|---|
| 2013/0023301 A1 | 1/2013 | Wang et al. |
| 2015/0223178 A1* | 8/2015 | Pietraski ............. H04W 52/346 370/252 |
| 2015/0304889 A1* | 10/2015 | Qian ................. H04W 72/1289 370/235 |
| 2016/0080108 A1 | 3/2016 | Ben Ami et al. |
| 2016/0100318 A1 | 4/2016 | Wei |

* cited by examiner

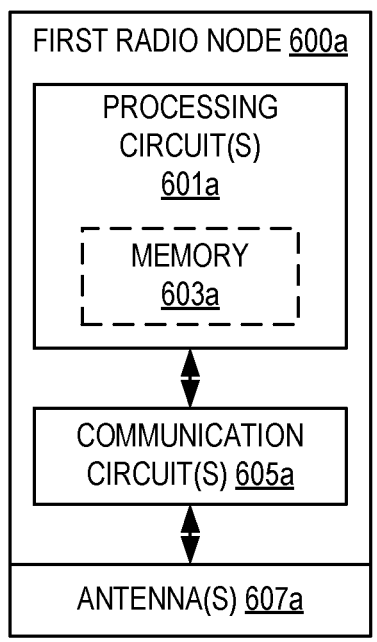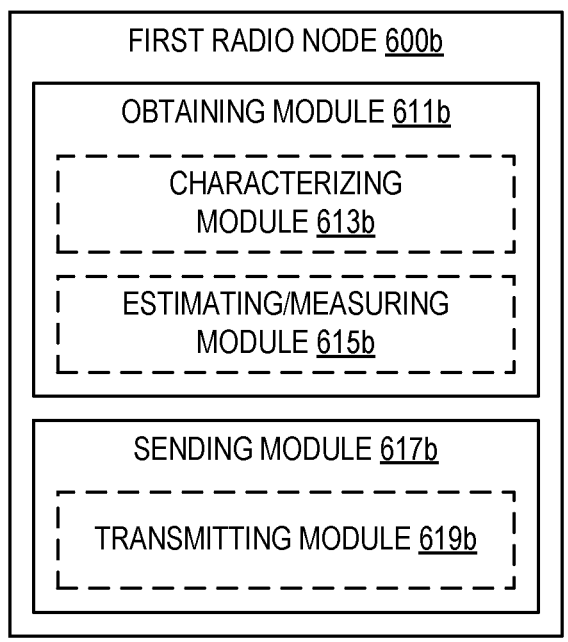
FIG. 6A
FIG. 6B

1000

1001: BY A NETWORK NODE FOR SHARING CHANNEL INFORMATION BETWEEN FIRST AND SECOND RADIO NODES THAT ARE CO-LOCATED, RECEIVE, FROM THE FIRST NODE, FIRST CHANNEL INFORMATION THAT CHARACTERIZES A FIRST COMMUNICATION CHANNEL BETWEEN THE FIRST NODE AND A THIRD RADIO NODE IN A FIRST FREQUENCY BAND

↓

1003: DETERMINE SECOND CHANNEL INFORMATION THAT CHARACTERIZES A SECOND COMMUNICATION CHANNEL BETWEEN THE THIRD NODE OR A FOURTH RADIO NODE AND THE SECOND NODE IN THE SECOND FREQUENCY BAND BASED ON THE FIRST CHANNEL INFORMATION

↓

1005: CHARACTERIZE THE SECOND COMMUNICATION CHANNEL BASED ON THE FIRST CHANNEL INFORMATION TO OBTAIN THE SECOND CHANNEL INFORMATION

↓

1007: ESTIMATE A VALUE OF A CERTAIN CHARACTERISTIC OF THE SECOND COMMUNICATION CHANNEL BASED ON A VALUE OF THE CERTAIN CHARACTERISTIC OF THE COMMUNICATION CHANNEL BETWEEN THE THIRD NODE AND THE FIRST NODE IN THE FIRST FREQUENCY BAND AS INDICATED BY THE FIRST CHANNEL INFORMATION TO OBTAIN THE SECOND CHANNEL INFORMATION

↓

1009: SEND, TO THE SECOND NODE, THE SECOND CHANNEL INFORMATION SO AS TO ALLOW THE SECOND NODE TO USE THE SECOND CHANNEL INFORMATION FOR COMMUNICATION WITH THE THIRD NODE OR THE FOURTH NODE IN THE SECOND FREQUENCY BAND

| 1701c: DETERMINE A DIFFERENCE BETWEEN A VALUE OF A PROPAGATION CHARACTERISTIC OF A FIRST COMMUNICATION CHANNEL USED FOR COMMUNICATION BETWEEN THE THIRD NODE AND THE FIRST NODE IN THE FIRST FREQUENCY BAND AND A VALUE OF THE PROPAGATION CHARACTERISTIC OF A SECOND COMMUNICATION CHANNEL USED FOR COMMUNICATION BETWEEN THE THIRD NODE OR THE FOURTH NODE AND THE SECOND NODE IN THE SECOND FREQUENCY BAND; AND |

↓

1703c: DETERMINE A CALIBRATION VALUE RELATED TO THE PROPAGATION CHARACTERISTIC REPRESENTING THE DIFFERENCE.

FIG. 17C

SYSTEMS AND METHODS OF SHARING CHANNEL INFORMATION BETWEEN CO-LOCATED RADIO NODES

FIELD OF DISCLOSURE

The present disclosure relates generally to the field of communications, and in particular to sharing channel information between co-located radio nodes.

BACKGROUND

Fifth generation wireless systems (5G) will utilize higher frequency bands including millimeter wavelength (mmW) frequencies to allow the use of wider bandwidths. The use of large antenna arrays and beamforming, also at the terminal side, is considered to provide a sufficient link budget at the higher frequencies.

It is expected that 5G-capable base stations may be co-sited with legacy third generation wireless systems (3G) or Long Term Evolution (LTE) base stations, or even that multi-standard or multi-frequency products will be developed.

Recent research on radio wave propagation has shown that certain characteristics of the wireless radio channel are remarkably similar over wide frequency ranges, e.g. over the 0-100 GHz range. Such characteristics include the directions of arrival and departure and the path lengths/time delays of radio waves, their relative power, as well as a host of characteristics derived from these parameters. Examples of the latter are mean angles, minimum propagation delays, delay and angular spreads, Doppler spread (with appropriate frequency scaling), etc. For further information, see e.g., Katsuyuki Haneda et al., *Millimetre-Wave Based Mobile Radio Access Network for Fifth Generation Integrated Communications*, H2020-ICT-671650-mmMAGIC/D2.2 (Michael Peter ed., Dec. 5, 2017), available at https://bscw.5g-mmmagic.eu/pub/bscw.cgi/d202656/mmMAGIC_D2-2.pdf.

For spectrum efficient communication, the transmission must be adapted to the radio channel conditions, for example by link adaptation, power control, and beam forming. To measure and estimate the channel characteristics accurately takes time. This leads to initial delays in transmissions.

When high frequency access such as 5G New Radio (NR) is co-sited with low frequency access such as LTE, the high frequency access is expected to have less and spottier coverage. At higher frequencies, advanced beamforming and/or multi-antenna transmission techniques are expected to be required. This brings about the problem to provide full channel state information (CSI) for all combinations of beamforming directions and/or antenna array precoders. Without this information, there will be areas where the channel characteristics of the high frequency access are unknown or less accurately estimated even though access and communication would be possible.

When beam sweeping is used, access and reconnection may be considerably delayed and may result in less utilization of these frequency bands.

Additional challenges with high frequency communication include initial access and synchronization, channel estimation, and link adaptation, which are all made more challenging by the use of beamforming and onerous link budgets. Furthermore, blocking by stationary or moving objects is more severe at higher frequencies or when using high gain beamforming. Accordingly, there is a need for improved techniques to improve operations on additional frequency bands. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiment of the present disclosure relate to sharing channel information between co-located radio nodes having different frequency access. According to one aspect, a method performed by a second radio node (e.g., base transceiver station) of sharing channel information between a first radio node (e.g., base transceiver station) and the second radio node that are co-located includes obtaining, by the second node, first channel information that characterizes a communication channel between a third radio node (e.g., wireless devices such as a UE) and the first node in a first frequency band. Further, the method includes using, by the second node, the first channel information for communication with the third node or a fourth radio node (e.g., UE) in a second frequency band.

According to another aspect, the step of obtaining may include receiving, from the first node, the first channel information.

According to another aspect, the step of using the first channel information may include determining second channel information that characterizes a communication channel between the third or fourth node and the second node in the second frequency band based on the first channel information.

According to another aspect, the method may include obtaining, by the second node, third channel information that characterizes a communication channel between the first and third nodes in a third frequency band. Further, the step of determining the second channel information may also be based on the third channel information.

According to another aspect, the step of determining the second channel information may include interpolating values of a certain characteristic of a communication channel between the first and third nodes in the first and third frequency bands as represented by the respective first and third channel information to obtain the second channel information.

According to another aspect, the method may include weighting, prior to said interpolating, the values of the certain characteristic of the communication channel between the first and third nodes in the first and third frequency bands as represented by the respective first and third channel information.

According to another aspect, the step of weighting may be based on propagation effects associated with the certain characteristic of the communication channel in the first, second and third frequency bands.

According to another aspect, the step of weighting may be based on locations in frequency of the first, second and third frequency bands.

According to another aspect, the step of determining the second channel information may include initializing the second channel information based on the first channel information. According to another aspect, the step of using the first channel information may include transmitting, to the third or fourth node, a signal in the second frequency band based on the first channel information.

According to another aspect, the step of using the first channel information may include channel coding or modulating a signal for transmission to the third or fourth node in the second frequency band based on the first channel information.

According to another aspect, the step of using the first channel information may include beamforming a signal for transmission to the third or fourth node in the second frequency band based on direction of arrival or departure information of a respective reception or transmission of a communication between the first and third nodes in the first frequency band. Further, the first channel information may include the direction of arrival or departure information related to the first frequency band.

According to another aspect, the step of using the first channel information may include estimating direction of arrival or departure information of a respective reception or transmission of a communication between the third or fourth node and the second node in the second frequency band based on direction of arrival or departure information of a respective reception or transmission of a communication between the first and third nodes in the first frequency band. Further, the first channel information may include the direction of arrival or departure information related to the first frequency band.

According to another aspect, the step of using the first channel information may include beam searching or tracking a transmission between the third or fourth node and the second node in the second frequency band based on direction of arrival or departure information of a respective reception or transmission of a communication between the first and third nodes in the first frequency band. Further, the first channel information may include the direction of arrival or departure information related to the first frequency band.

According to another aspect, the step of using the first channel information may include receiving, from the third or fourth node, a signal in the second frequency band based on the first channel information.

According to another aspect, the step of using the first channel information may include demodulating or channel decoding a signal received from the third or fourth node in the second frequency band based on the first channel information.

According to another aspect, the step of using the first channel information may include determining a channel estimate of a signal received from the third or fourth node in the second frequency band based on channel estimate information associated with a communication between the first and third nodes in the first frequency band. Further, the first channel information may include the channel estimate information.

According to another aspect, the step of using the first channel information may include determining a direction of arrival or departure of a respective reception or transmission of a communication between the third or fourth node and the second node in the second frequency band responsive to determining that the first channel information indicates that the communication channel between the first and third nodes in the first frequency band is blocked.

According to another aspect, the step of using the first channel information may include determining to perform a handover associated with the third or fourth node responsive to determining that the first channel information indicates that the communication channel between the first and third nodes in the first frequency band is blocked.

According to another aspect, the method may include sending, to the first node, an indication that the second node has determined to perform the handover associated with the third or fourth node.

According to another aspect, the step of using the first channel information may include determining a candidate set of radio nodes or cells that are capable of communications with the third or fourth node responsive to determining that the first channel information indicates that the communication channel between the first and third nodes in the first frequency band is blocked.

According to another aspect, the method may include sending, to the first node, an indication of the candidate set of radio nodes or cells.

According to another aspect, the step of using the first channel information may include beam searching or tracking a transmission between the third or fourth node and the second node in the second frequency band based on a beam usage statistic associated with reception or transmission of a communication between the first and third nodes in the first frequency band. Further, the first channel information may include the beam usage statistic.

According to another aspect, the step of using the first channel information may include calibrating a plurality of antennas of the second node for communication with the third or fourth node in the second frequency band based on direction of arrival or departure information of a respective reception or transmission of a communication between the first and third nodes in the first frequency band. Further, the first channel information may include the direction of arrival or departure information related to the first frequency band.

According to another aspect, the step of calibrating may include determining phase offsets associated with the plurality of antennas based on the direction of arrival or departure information related to the first frequency band and then determining calibration coefficients associated with the plurality of antennas based on the phase offsets. Further, the step of calibrating may include calibrating the plurality of antennas based on the calibration coefficients.

According to another aspect, the step of using the first channel information may include performing channel synchronization between the second node and the third or fourth node in the second frequency band based on channel timing information associated with communications between the first and third nodes in the first frequency band. Further, the first channel information may include the channel timing information.

According to another aspect, the step of using the first channel information may include configuring a granularity of reference signals or CSI reporting for the communication with the third or fourth node in the second frequency band based on channel estimate information associated with communication between the first and third nodes in the first frequency band. Further, the first channel information may include the channel estimate information.

According to another aspect, the step of using the first channel information may include configuring a cyclic prefix for the communication between the third or fourth node and the second node in the second frequency band based on time dispersion information associated with communications between the first node and one or more radio nodes in the first frequency band. Further, the first channel information may include the time dispersion information.

According to another aspect, the step of using the first channel information may include adapting a transmission parameter for the communication with the third or fourth node in the second frequency band based on channel quality information related to a communication between the first and third nodes in the first frequency band. Further, the first channel information may include the channel quality information.

According to another aspect, the transmission parameter may include at least one of a transmission rank, a modulation scheme, a transmission power and a coding scheme.

According to another aspect, the step of using the first channel information may include determining a difference between a value of a propagation characteristic of a first communication channel used for communication between the first and third nodes in the first frequency band and a value of the propagation characteristic of a second communication channel used for communication between the third or fourth node and the second node in the second frequency band. Further, the step of using the first channel information may include determining a calibration value related to the propagation characteristic representing the difference.

According to another aspect, the step of using the first channel information may include spatially combining or filtering a signal received from the third or fourth node in the second frequency band based on the first channel information.

According to another aspect, the first and second nodes may correspond to different radio access technologies.

According to another aspect, the step of using the first channel information may include the first node being configured to operate according to a Long Term Evolution (LTE) radio access technology and the second node being configured to operate according to a 5G New Radio (NR) radio access technology.

According to another aspect, the second node may be configured to operate according to a Long Term Evolution (LTE) radio access technology and the first node may be configured to operate according to a 5G New Radio (NR) radio access technology.

According to another aspect, the first channel information may include a direction of arrival or departure information of a respective reception or transmission of a communication between the first and third nodes in the first frequency band.

According to another aspect, the direction of arrival or departure information may include at least one of direction of departure, direction of arrival, angular spread, antenna cross-correlation, precoder index, beam shape, beam index, and power per beam.

According to another aspect, the first channel information may include channel quality information related to a communication between the first and third nodes in the first frequency band.

According to another aspect, the channel quality information may include at least one of path loss, received power, channel rank indicator, modulation scheme, coding scheme, singular value spread, singular value ratio, condition number, and coherence time.

According to another aspect, the first channel information may include propagation delay information related to a communication between the first and third nodes in the first frequency band.

According to another aspect, the propagation delay information may include at least one of mean propagation delay, delay spread, coherence bandwidth, timing advance, and roundtrip time.

According to another aspect, the first channel information may include channel timing information related to a communication between the first and third nodes in the first frequency band.

According to another aspect, the channel timing information may include at least one of Doppler shift, Doppler spread, coherence time, level crossing rate, and fading depth.

According to another aspect, the channel timing information may include channel estimate information.

According to another aspect, the channel estimate information may include coherence properties in time or frequency characterizing one or more channel estimates of communications between the first and third nodes in the first frequency band.

According to another aspect, the second channel information that characterizes a communication channel between the third or fourth node and the second node in the second frequency band may be correlated with the first channel information.

According to another aspect, each of the first and second nodes may include a plurality of antennas.

According to another aspect, the first and second nodes may use a same plurality of antennas.

According to another aspect, the first and second nodes may use different multi-antenna receive or transmit techniques.

According to another aspect, the first and second frequency bands may be non-overlapping frequency bands.

According to another aspect, the first frequency band may be located at a higher frequency band than the second frequency band.

According to another aspect, the second frequency band may be located at a higher frequency band than the first frequency band.

According to another aspect, the third node may be geographically proximate the fourth node.

According to another aspect, a single radio network node may include the first and second nodes.

According to another aspect, the step of obtaining first channel information may include receiving, from a network node via the first node, the first channel information.

According to one aspect, a second radio node capable of sharing channel information with a first radio node that is co-located with the second node comprises a processing circuit configured to obtain first channel information that characterizes a communication channel between a third radio node and the first node in a first frequency band. Further, the processing circuit is configured to use, by the second node, the first channel information for communication with the third node or a fourth radio node in a second frequency band.

According to one aspect, a method performed by a first radio node of sharing channel information between the first radio node and a second radio node that are co-located comprises obtaining, by the first node, first channel information that characterizes a communication channel between a third radio node and the first node in a first frequency band. Further, the method comprises sending, by the first node, to the second node, the first channel information so as to allow the second node to use the first channel information for communication with the third node or a fourth radio node in a second frequency band.

According to another aspect, the step of obtaining the first channel information may include characterizing the communication channel between the first and third nodes in the first frequency band to obtain the first channel information.

According to another aspect, the step of characterizing the communication channel may include estimating or measuring a value of a certain characteristic of the communication channel between the first and third nodes in the first frequency band to obtain the first channel information.

According to another aspect, the step of sending the first channel information may be via a network node.

According to one aspect, a first radio node capable of sharing channel information with a second radio node that is co-located with the first node comprises a processing circuit configured to obtain first channel information that characterizes a communication channel between a third radio node and the first node in a first frequency band. Further, the processing circuit is configured to send, to the second node, the first channel information so as to allow the second node to use the first channel information for communication with the third or fourth node in a second frequency band.

According to one aspect, a method performed by a network node for sharing channel information between first and second radio nodes that are co-located comprises receiving, from the first node, first channel information that characterizes a communication channel between the first node and a third radio node in a first frequency band. Further, the method comprises determining second channel information that characterizes a communication channel between the third node or a fourth radio node and the second node in the second frequency band based on the first channel information. Also, the method comprises sending, to the second node, the second channel information so as to allow the second node to use the second channel information for communication with the third or fourth node in the second frequency band.

According to another aspect, the step of determining the second channel information may include characterizing the communication channel between the third or fourth node and the second node in the second frequency band based on the first channel information to obtain the second channel information.

According to another aspect, the step of determining the second channel information may include estimating a value of a certain characteristic of the communication channel between the third or fourth node and the second node in the second frequency band based on a value of the certain characteristic of the communication channel between the first and third nodes in the first frequency band as indicated by the first channel information to obtain the second channel information.

According to one aspect, a network node capable of sharing channel information with first and second radio nodes that are co-located comprises a processing circuit configured to receive, from the first node, first channel information that characterizes a communication channel between the first node and a third radio node in a first frequency band. Further, the processing circuit is configured to determine second channel information that characterizes a communication channel between the third node or a fourth radio node and the second node in the second frequency band based on the first channel information. Also, the processing circuit is configured to send, to the second node, the second channel information so as to allow the second node to use the second channel information for communication with the third or fourth node in the second frequency band.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 6A-B illustrate other embodiments of a first radio node in accordance with various aspects as described herein.

FIG. 10 illustrates one embodiment of a method performed by a network node for sharing channel information between first and second radio nodes that are co-located in accordance with various aspects as described herein.

FIGS. 17A-C illustrate embodiments of a method performed by a second radio node of using channel information shared between co-located radio nodes operating in different frequency bands to calibrate an antenna array of the second node in a second frequency band in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
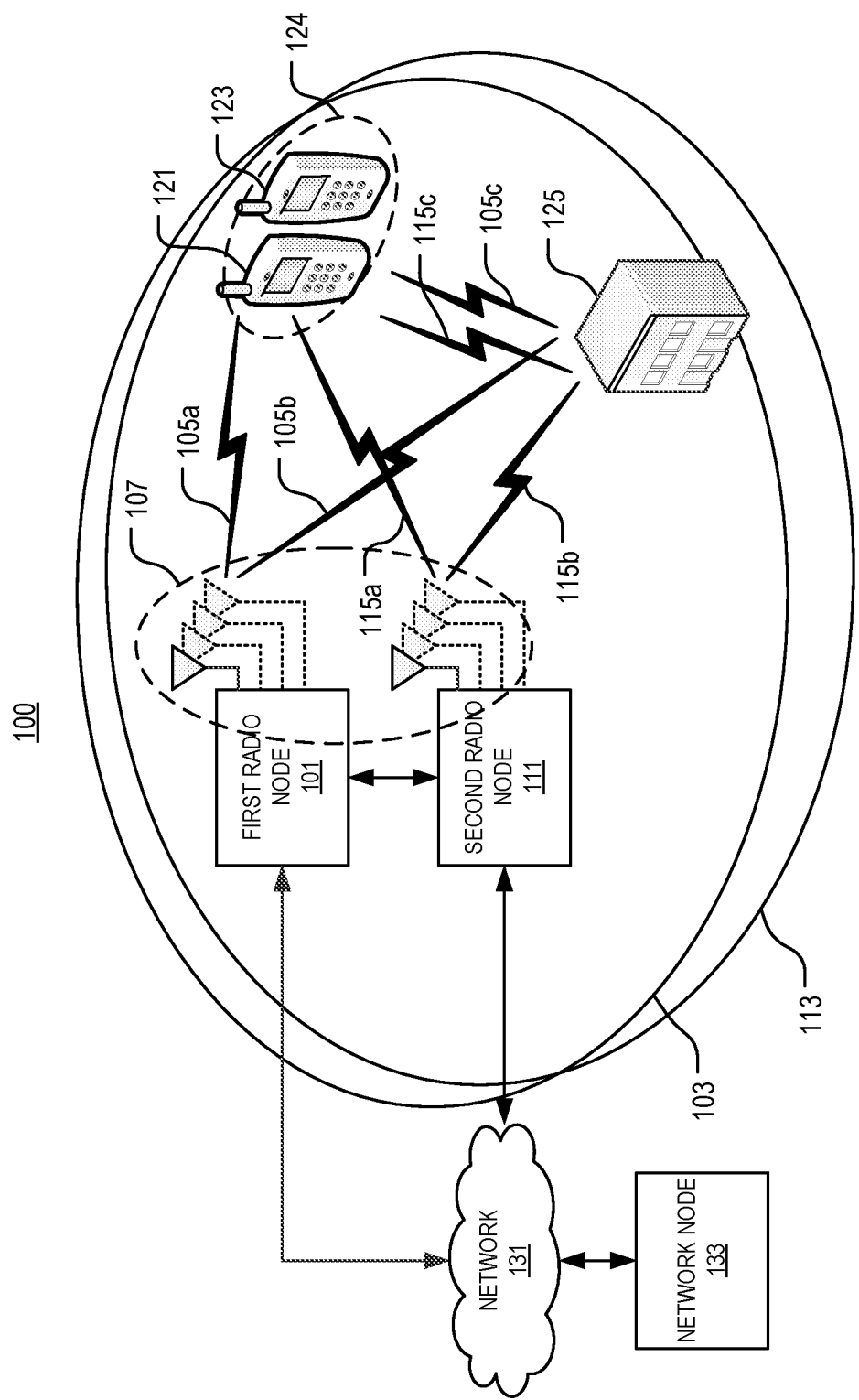
FIG. 1 illustrates one embodiment of a system for sharing channel information between co-located radio nodes in accordance with various aspects as described herein.

This disclosure includes describing systems and methods for sharing channel information between co-located radio nodes having different frequency access. The embodiments described herein provide many advantages over existing solutions such as improved speed and efficiency of initial access and beam searching or tracking, improved CSI quality, early warning of blocking events, improved calibration of antenna arrays, improved synchronization establishment, more robust channel estimation, and other advantages. These advantages are effectuated by sharing channel-related information between co-sited radio nodes operating on different frequency bands. For instance, FIG. 1 illustrates one embodiment of a system 100 for sharing channel information between co-located (e.g., geographically proximate) radio nodes 101, 111 in accordance with various aspects as described herein. In FIG. 1, the first and second radio nodes 101, 111 (e.g., base transceiver stations) may be configured to communicate with each other over a wired or wireless link. The first and second nodes 101, 111 or one or more antennas of each first and second node 101, 111 may be geographically proximate 107 so that channel information that characterizes a communication channel 105a-c between the first radio node 101 and a third or fourth radio node 121, 123 (e.g., wireless devices) is correlated or substantially correlated with channel information that characterizes a communication channel 115a-c between the second radio node 111 and the third or fourth radio node 121, 123. In one example, the first radio node 101 may obtain first channel information that characterizes the communication channel 105a-c between the third radio node 121 and the first radio node 101 in a first frequency band.

In this embodiment, the third and fourth radio nodes 121, 123 may be co-located (e.g., geographically proximate). For instance, the third and fourth radio nodes 121, 123 or antennas of the third and fourth radio nodes 121, 123 may be geographically proximate 124 so that channel information that characterizes a communication channel between the first or second node 101, 111 and the third node 121 is correlated or substantially correlated with channel information that characterizes a communication channel between the first or second node 111 and the fourth node 123. In one example, the third and fourth nodes 121, 123 are geographically proximate when carried by the same person (e.g., smartphone and wireless watch). In yet another example, the third and fourth nodes 121, 123 are geographically proximate when in the same vehicle, apartment, or home. In yet another example, the third and fourth nodes 121, 123 are geographically proximate when in the same geofence. A geofence is a virtual geographic boundary, defined by a global positioning system (GPS), radio frequency identification (RFID) technology, Bluetooth, or near field technology, that is placed around the third or fourth node 121, 123 to determine whether the other node is geographically proximate. In addition, the communication channel 105a represents one of the propagation paths between the first node 101 and the third or fourth nodes 121, 123. In yet another example, the third and fourth nodes 121, 123 are geographically proximate when they have about the same GPS coordinates. Also, the communication channel 105b,c represents different segments of another propagation path (i.e., reflection off of building 125) between the first node 101 and the third or fourth nodes 121, 123.

In FIG. 1, the first radio node 101 may send, to the second radio node 111, the first channel information. The second radio node 111 may receive, from the first node 101, and may use the first channel information for communication on the communication channel 115a-c with the third radio node 121 or the fourth radio node 123 in a second frequency band. The communication channel 115a represents one of the propagation paths between the second node 111 and the third or fourth nodes 121, 123. Also, the communication channel 115b,c represents different segments of another propagation path (i.e., reflection off of building 125) between the second node 111 and the third or fourth nodes 121, 123. The third radio node 121 may be geographically proximate the fourth radio node 123 so that the channel information that characterizes a communication channel between the third radio node 121 and the first or second radio node 101, 111 is correlated or substantially correlated with the channel information that characterizes a communication channel between the fourth radio node 123 and the first or second radio node 101, 111. The proximity of the third and fourth radio nodes 121, 123 may be determined, for instance, based on determining a location of the third and fourth radio nodes 121, 123 such as from location information (e.g., GPS data).

Furthermore, each radio node 101, 111 may communicate with the other via a network node 133 (e.g., core network node) such as over a network 131 (e.g., core network). In one example, the network node 133 may receive, from the first radio node 101 such as via the network 131, first channel information that characterizes the communication channel 105a-c between the first radio node 101 and the third radio node 121 in the first frequency band. Further, the network node 133 may determine second channel information that characterizes the communication channel 115a-c between the third radio node 121 or a fourth radio node 123 and the second radio node 111 in the second frequency band based on the first channel information. Also, the network node 133 may send, to the second radio node 111 such as via the network 131, the second channel information so as to allow the second radio node 111 to use the second channel information for communication with the third radio node 121 or the fourth radio node 123 in the second frequency band. The network 131 may be a core network, a local-area network (LAN), a wide-area network (WAN), the Internet, a computer network, a wireless network, a telecommunications network, another like network or any combination thereof.

In this embodiment, each radio node 101, 111 may be a node that includes a receiver, transmitter, or both (e.g., transceiver). Further, each radio node 101, 111 may include one or more antennas. In one example, each radio node 101, 111 may include an antenna array that is capable of beam searching, beam tracking, beamforming, or the like. In addition, each radio node 101, 111 or one or more antennas of each radio node 101, 111 may be co-located such as being co-sited or geographically positioned proximate to each other. With the radio nodes 101, 111 being proximate to each other, first channel information that characterizes the communication channel 105a-c between the first radio node 101 and the third radio node 121 in the first frequency band may be correlated or substantially correlated to second channel information that characterizes the communication channel 115a-c between the second radio node 111 and the third radio node 121 or the fourth radio node 123 that is proximate the third node 121 in the second frequency band.

In FIG. 1, each radio node 101, 111 may be capable of supporting one or more radio access technologies (RATs) such as IEEE 802.xx, CDMA, WCDMA, GSM, LTE, UTRAN, WiMax, 5G NR, or the like. Further, each radio node 101, 111 may operate in one or more frequency bands. Also, each radio node 101, 111 may have a respective coverage area 103, 113. In one example, the first radio node 101 may be capable of supporting the LTE RAT at two (2) GHz and the second radio node 111 may be capable of supporting the 5G NR RAT at less than and/or greater than two (2) GHz such as twenty-eight (28) GHz. In another example, the first and second radio nodes 101, 111 may be the same radio node that supports multimode operation (i.e., multiple RATs and/or multiple frequency bands).

In some embodiments, the generic terminology "radio network node" may include a base station (BS), radio base station (RBS), base transceiver station (BTS), Node B (NB), Next Radio base station (NR BS), evolved Node B (eNB), multi-cell/multicast coordination entity (MCE), relay node (RN), access point (AP), radio access point, Remote Radio Unit (RRU), Remote Radio Head (RRH), a multi-standard base station (e.g., MSR BS), test equipment, a network node that has a transmitter, receiver or both, or the like.

In some embodiments, the generic terminology "wireless device" may include a user equipment (UE), mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, metering device, or some other like terminology. In addition, the wireless device may be capable of operating using multiple radio access technologies.

In some embodiments, the generic terminology "radio node" may include a radio network node, a wireless device, a node that has a transmitter, receiver or both, or the like.

In some embodiments, the generic terminology "network node" may include a radio network node, a base station controller (BSC), a network controller, a core network node (e.g., mobility management entity (MME), self-organizing network (SON) node, coordinating node, positioning node, mobile data terminal (MDT) node, an external node (e.g., third party node, a node external to the current network, a cloud-based node), or the like. The network node may also include test equipment.

Figure 2:
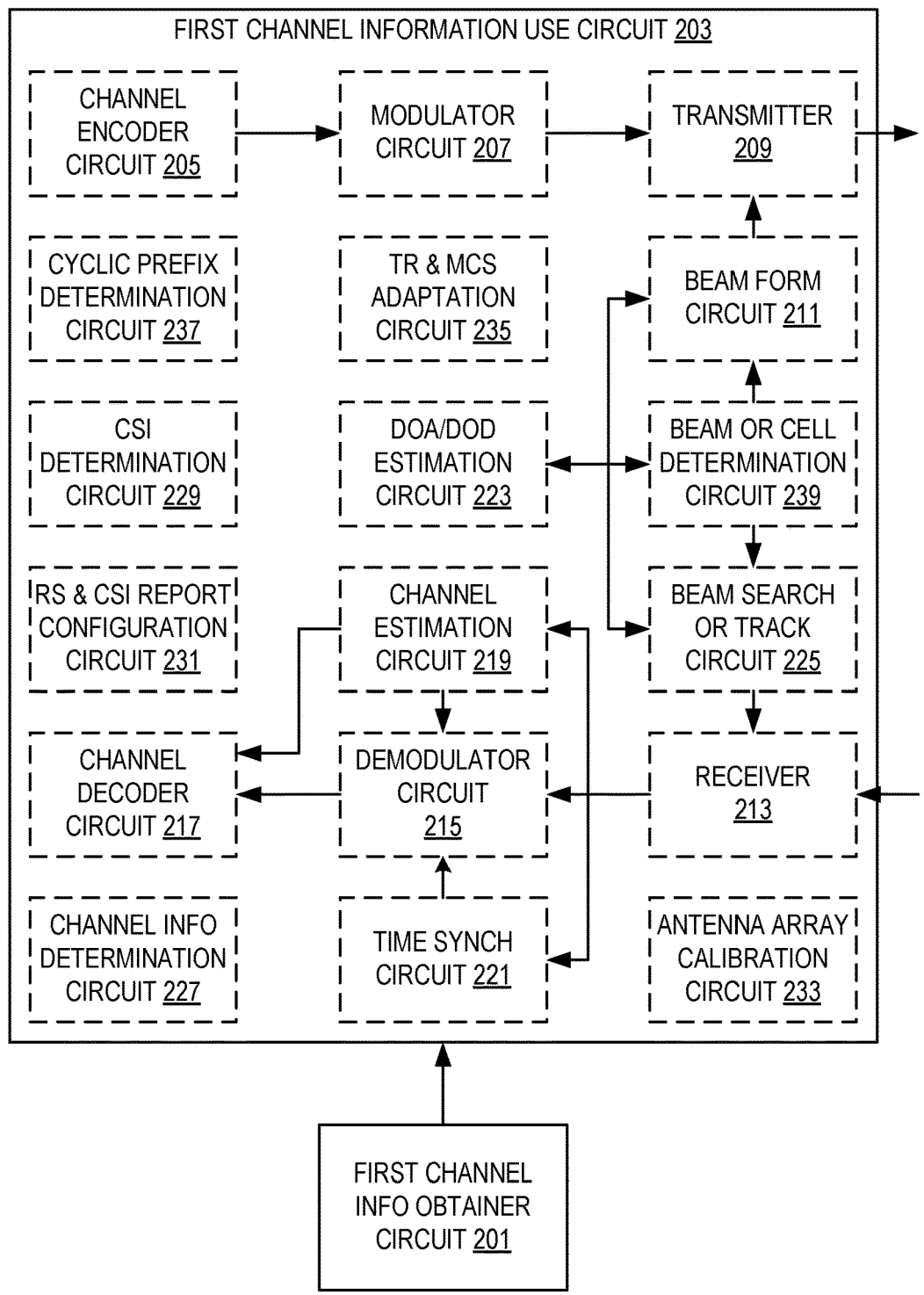
FIG. 2 illustrates one embodiment of a second radio node in accordance with various aspects as described herein.

FIG. 2 illustrates one embodiment of a second radio node 200 in accordance with various aspects as described herein. In FIG. 2, the second radio node 200 includes a first channel information obtainer circuit 201 configured to obtain first channel information that characterizes a communication channel between first and third radio nodes in a first frequency band. Further, the first and second radio nodes are co-located. In one example, the second radio node 200 may include a receiver circuit 213 configured to receive the first channel information from the first radio node. The second radio node 200 also includes a first channel information use circuit 203 configured to use the first channel information for communication with the third node or a fourth radio node in a second frequency band. This use circuit 203 may include various application units or modules.

In one embodiment, the use circuit 203 may include a channel encoder circuit 205 or a modulator circuit 207 configured to channel encode or modulate a signal for transmission to the third or fourth node in the second frequency band based on the first channel information.

In another embodiment, the use circuit 203 may include a transmitter circuit 209 or a receiver circuit 213 configured to transmit or receive, to or from the third or fourth node, a signal in the second frequency band based on the first channel information.

In another embodiment, the use circuit 203 may include a beam form circuit 211 configured to beam form a signal for transmission to the third or fourth node in the second frequency band based on the first channel information.

In another embodiment, the use circuit 203 may include a demodulator circuit 215 or a channel decoder circuit 217 configured to demodulate or channel decode a signal received from the third or fourth node in the second frequency band based on the first channel information.

In another embodiment, the use circuit 203 may include a channel estimation circuit 219 configured to determine second channel information that characterizes a communication channel between the third or fourth node and the second node in the second frequency band based on the first channel information (e.g., a time or frequency coherence property(ies) of the communication channel between the first and third nodes in the first frequency band).

In another embodiment, the use circuit 203 may include a time synchronization circuit 221 configured to perform time synchronization of a signal(s) transmitted by the third or fourth node to the second node in the second frequency band based on the first channel information (e.g., timing information associated with a communication between the first and third nodes in the first frequency band).

In another embodiment, the use circuit 203 may include a direction of arrival or departure (DOA/DOD) estimation circuit 223 configured to estimate a direction of a communication between the third or fourth node and the second node based on the first channel information (e.g., a direction of arrival or departure estimate of a communication between the first and third nodes in the first frequency band).

In another embodiment, the use circuit 203 may include a beam search or track circuit 225 configured to perform beam searching or beam tracking of a transmission(s) from the third or fourth node to the second node in the second frequency band based on the first channel information (e.g., a beam usage statistic(s) associated with a communication between the first and third nodes in the first frequency band).

In another embodiment, the use circuit 203 may include a channel information determining circuit 227 configured to determine second channel information that characterizes a communication channel between the third or fourth node and the second node in the second frequency band based on the first channel information.

In another embodiment, the use circuit 203 may include a CSI determination circuit 229 configured to determine the CSI for a communication channel between the third or fourth node and the second node in the second frequency band based on the first channel information (e.g., a direction of arrival or departure estimate of a communication between the first and third nodes in the first frequency band).

In another embodiment, the use circuit 203 may include a reference signal (RS) granularity or CSI reporting granularity configuration circuit 231 for configuring an RS granularity or CSI reporting granularity for a communication channel between the third or fourth node and the second node in the second frequency band based on the first channel information (e.g., a time or frequency coherence property(ies) of the communication channel between the first and third nodes in the first frequency band).

In another embodiment, the use circuit 203 may include an antenna array calibration circuit 233 configured to calibrate an antenna array of the second node in the second frequency band based on the first channel information (e.g., a direction of arrival or departure estimate of a communication between the first and third nodes in the first frequency band).

In another embodiment, the use circuit 203 may include a transmission rank (TR) or modulation or coding scheme (MCS) adaptation circuit 235 configured to adapt or adjust a transmission rank or a modulation or coding scheme for a communication channel between the third or fourth node and the second node in the second frequency band based on the first channel information (e.g., a channel quality estimate of the communication channel between the first and third nodes in the first frequency band).

In another embodiment, the use circuit 203 may include a cyclic prefix (CP) determination circuit 237 configured to determine a CP for a communication channel between the third or fourth node and the second node in the second frequency band based on the first channel information (e.g., a time dispersion statistic(s) of the communication channel between the first and third nodes in the first frequency band).

In another embodiment, the use circuit 203 may include a beam or cell determination circuit 239 configured to determine a beam or cell for a communication channel between the third or fourth node and the second node in the second frequency band based on the first channel information (e.g., a detected blocking event of a communication between the first and third nodes in the first frequency band).

Figure 3A:
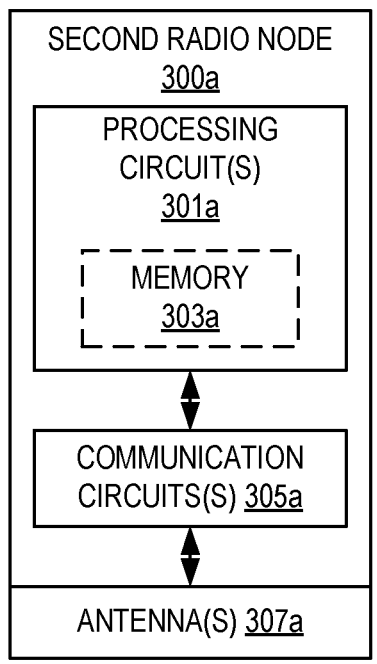
FIGS. 3A-B illustrate other embodiments of a second radio node in accordance with various aspects as described herein.
Figure 3B:
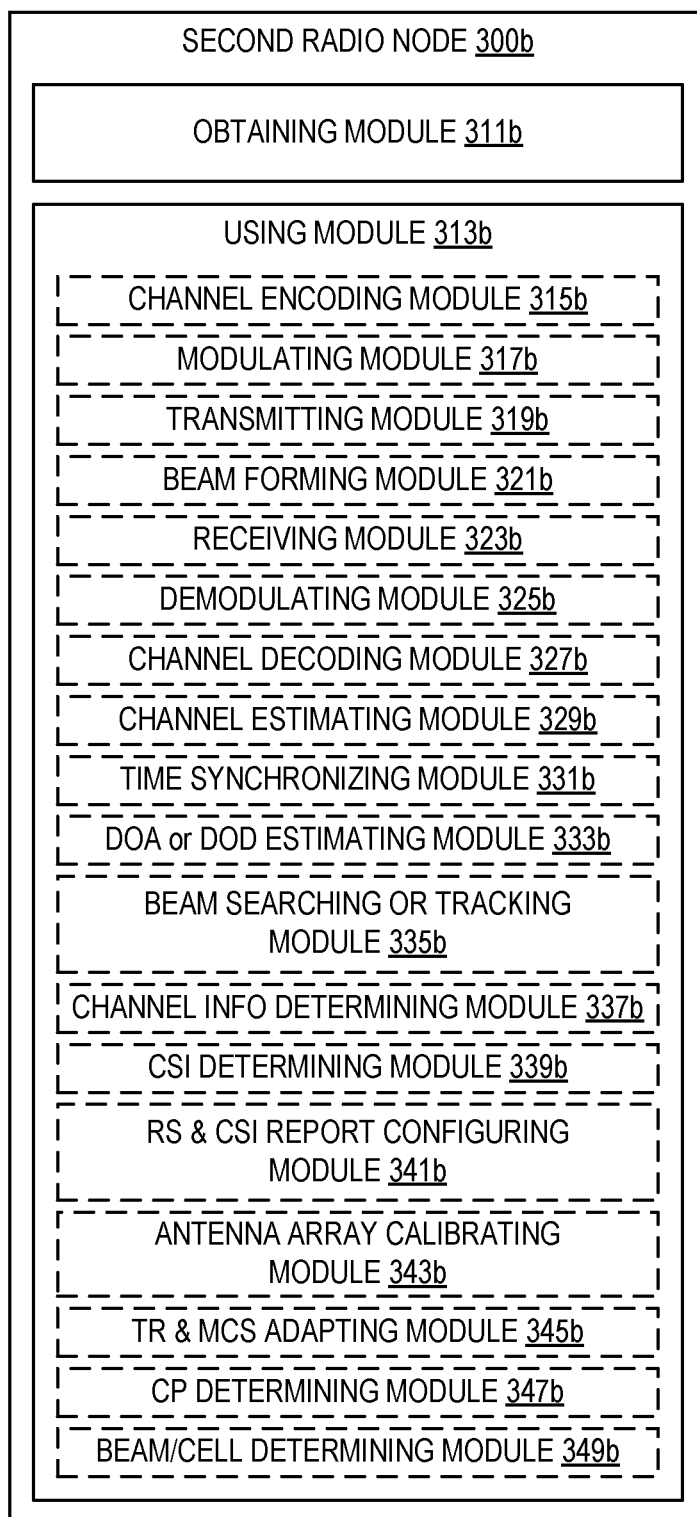

FIGS. 3A-B illustrate other embodiments of a second radio node 300*a-b* in accordance with various aspects as described herein. In FIG. 3A, the second radio node 300*a* (e.g., the second radio node 111 in FIG. 1) may include processing circuit(s) 301*a*, radio frequency (RF) communications circuit(s) 305*a*, antenna(s) 307*a*, the like, or any combination thereof. The communication circuit(s) 305*a* may be configured to transmit or receive information to or from one or more network nodes or radio nodes via any wired or wireless communication technology. This communication may occur using the one or more antennas 307*a* that are either internal or external to the second radio node 300*a*. The processing circuit(s) 301*a* may be configured to perform processing as described herein (e.g., the method of FIGS. 4, 7, 10, 13-23) such as by executing program instructions stored in memory 303*a*. The processing circuit(s) 301*a* in this regard may implement certain functional means, units, or modules.

In FIG. 3B, the second radio node 300*b* may be capable of wired or wireless communications with a first radio node (e.g., the first radio node 101 in FIG. 1) or a network node (e.g., the network node 133 in FIG. 1). Further, the second radio node 300*b* may be capable of wireless communications with one or more radio nodes (e.g., the third radio node 121 and the fourth radio node 123 in FIG. 1). In FIG. 3B, the second radio node 300*b* may implement various functional means, units, or modules (e.g., via the processing circuit(s) 301*a* in FIG. 3A or via software code). These functional means, units, or modules (e.g., for implementing the methods of FIGS. 4, 7, 10, 13-23) may include an obtaining unit or module 311*b* for obtaining first channel information that characterizes a communication channel between a third radio node and the first radio node in a first frequency band. Further, the second radio node 300*b* and the first radio node or one or more antennas of each first and second radio node may be co-located such as the second radio node 300*b* or one or more of its antennas being geographically proximate the first radio node or one or more of its antennas. Also, these functional means, units, or modules may include a first channel information using unit or module 313*b* for using the first channel information for communication with the third node or a fourth radio node in a second frequency band. The using unit or module 313*b* may include various application units or modules.

In one embodiment, the using unit or module 313*b* may include a channel encoding unit or module 315*b* or a modulating unit or module 317*b* for channel encoding or modulating a signal for transmission to the third or fourth node in the second frequency band based on the first channel information.

In another embodiment, the using unit or module 313*b* may include a transmitting unit or module 319*b* or a receiving unit or module 323*b* for transmitting or receiving, to or from the third or fourth node, a signal in the second frequency band based on the first channel information.

In another embodiment, the using unit or module 313*b* may include a beam forming unit or module 321*b* for beamforming a signal for transmission to the third or fourth node in the second frequency band based on the first channel information.

In another embodiment, the using unit or module 313*b* may include a demodulating unit or module 325*b* or a channel decoding unit or module 327*b* for demodulating or channel decoding a signal received from the third or fourth node in the second frequency band based on the first channel information.

In another embodiment, the using unit or module 313*b* may include a channel estimating unit or module 329*b* for determining second channel information that characterizes a communication channel between the third or fourth node and the second node in the second frequency band based on the first channel information.

In another embodiment, the using unit or module 313*b* may include a time synchronizing unit or module 331*b* for performing time synchronization of a signal(s) transmitted by the third or fourth node to the second node in the second frequency band based on the first channel information.

In another embodiment, the using unit or module 313*b* may include a DOA/DOD estimating unit or module 333*b* for estimating a direction of a communication between the third or fourth node and the second node based on the first channel information.

In another embodiment, the using unit or module 313*b* may include a beam searching or beam tracking unit or module 335*b* for beam searching or tracking a transmission from the third or fourth node to the second node in the second frequency band based on the first channel information.

In another embodiment, the using unit or module 313*b* may include a channel information determining unit or module 337*b* for determining second channel information that characterizes a communication channel between the third or fourth node and the second node in the second frequency band based on the first channel information.

In another embodiment, the using unit or module 313*b* may include a CSI determination unit or module 339*b* for determining the CSI for a communication channel between the third or fourth node and the second node in the second frequency band based on the first channel information.

In another embodiment, the using unit or module 313*b* may include an RS granularity and CSI reporting granularity configuring unit or module 341*b* for configuring an RS granularity or CSI reporting granularity for a communication channel between the third or fourth node and the second node in the second frequency band based on the first channel information.

In another embodiment, the using unit or module 313*b* may include an antenna array calibrating unit or module 343*b* for calibrating an antenna array of the second node in the second frequency band based on the first channel information.

In another embodiment, the using unit or module 313*b* may include a TR and MCS adapting unit or module 345*b* for adapting or adjusting a transmission rank or a modulation or coding scheme for a communication channel between the third or fourth node and the second node in the second frequency band based on the first channel information.

In another embodiment, the using unit or module 313*b* may include a CP determining unit or module 347*b* for determining a CP for a communication channel between the third or fourth node and the second node in the second frequency band based on the first channel information.

In another embodiment, the using unit or module 313*b* may include a beam or cell determining unit or module 349*b* for determining a beam or cell for a communication channel between the third or fourth node and the second node in the second frequency band based on the first channel information.

Figure 4:
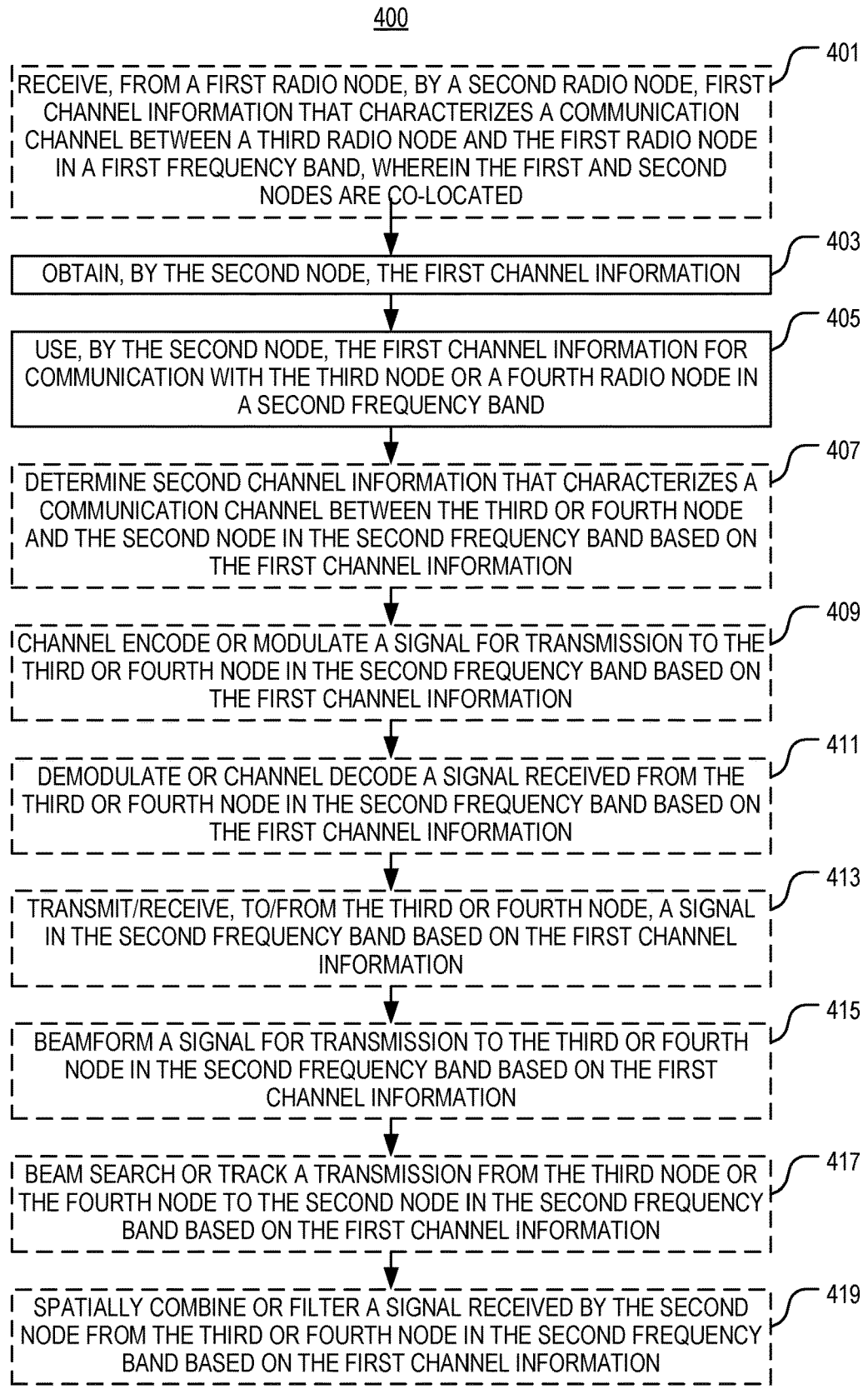
FIG. 4 illustrates one embodiment of a method performed by a second radio node for sharing channel information between first and second radio nodes that are co-located in accordance with various aspects as described herein.

FIG. 4 illustrates one embodiment of a method 400 for sharing channel information between first and second radio nodes that are co-located in accordance with various aspects as described herein. In FIG. 4, the method 400 may start, for instance, at block 401, where it may include receiving, from the first radio node, by the second radio node, first channel information that characterizes a communication channel between a third radio node and the first radio node in a first frequency band. Further, the first and second nodes or one or more antennas of each first and second node may be co-located. Further, at block 403, the method 400 includes obtaining, by the second node, the first channel information. Also, at block 405, the method 400 includes using, by the second node, the first channel information for communication with the third node or device fourth radio node in a second frequency band. At block 407, the method 400 may include determining second channel information that characterizes the communication channel between the third or fourth node and the second node in the second frequency band based on the first channel information.

Figure 5:
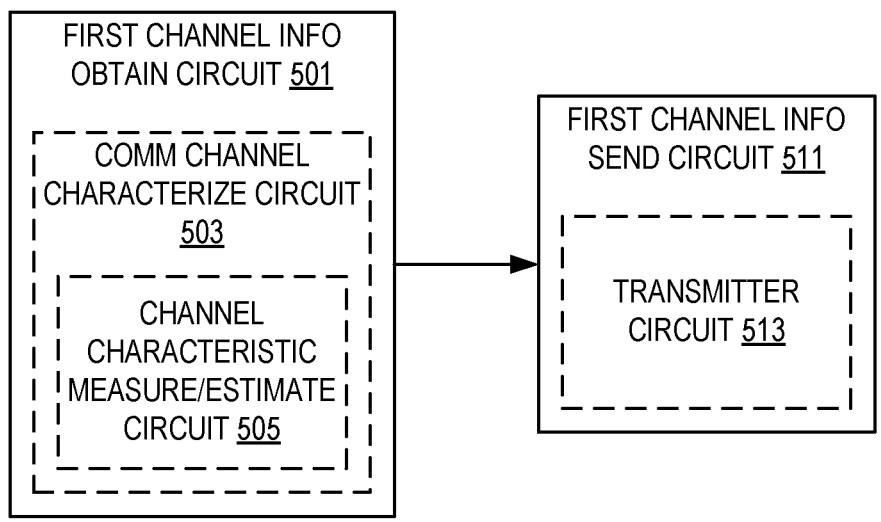
FIG. 5 illustrates one embodiment of a first radio node in accordance with various aspects as described herein.

In FIG. 4, at block 409, the method 400 may include channel encoding or modulating a signal for transmission to the third or fourth node in the second frequency band based on the first channel information. At block 411, the method 400 may include demodulating or channel decoding a signal received from the third or fourth node in the second frequency band based on the first channel information. At block 413, the method 400 may include transmitting or receiving, to or from the third or fourth node, a signal in the second frequency band based on the first channel information. At block 415, the method 400 may include beamforming a signal for transmission to the third or fourth node in the second frequency band based on the first channel information. At block 417, the method 400 may include beam searching or beam tracking a transmission from the third or fourth node to the second node in the second frequency band based on the first channel information. At block 419, the method 400 may include spatially combining or filtering a signal received from the third node or the fourth node in the second frequency band based on the first channel information FIG. 5 illustrates one embodiment of a first radio node 500 in accordance with various aspects as described herein. In FIG. 5, the first radio node 500 includes a first channel information obtain circuit 501 configured to obtain first channel information that characterizes a communication channel between the first node and a third radio node in a first frequency band. The first channel information obtain circuit 501 may include a communication channel characterization circuit 503 configured to characterize the communication channel between the first and third nodes in the first frequency band to obtain the first channel information. The characterization circuit 503 may include a communication channel measurement or estimation circuit 505 configured to estimate or measure a certain characteristic of the communication channel between the first and third nodes in the first frequency band. The first radio node 500 also includes a first communication channel information send circuit 511 configured to send, to a second radio node or a network node, the first channel information so as to allow the second node to use the first channel information for communication with the third node or a fourth radio node in a second frequency band. Further, the first and second nodes or one or more antennas of each first and second node are co-located. The first communication channel information send circuit 511 may include a transmitter circuit 513 configured to transmit, to the second node, the first channel information.

FIGS. 6A-B illustrate other embodiments of a first radio node in accordance with various aspects as described herein. In FIG. 6A, the first radio node 600a (e.g., the first radio node 101 in FIG. 1) may include processing circuit(s) 601a, RF communications circuit(s) 605a, antenna(s) 607a, the like, or any combination thereof. The communication circuit(s) 605a may be configured to transmit or receive information to or from one or more network nodes or radio nodes via any communication technology. This communication may occur using the one or more antennas 607a that are either internal or external to the first radio node 600a. The processing circuit(s) 601a may be configured to perform processing as described herein (e.g., the method of FIGS. 4, 7, 10, 13-23) such as by executing program instructions stored in memory 603a. The processing circuit(s) 601a in this regard may implement certain functional means, units, or modules.

In FIG. 6B, the first radio node 600b may be capable of wired or wireless communications with a second radio node (e.g., the second radio node 111 in FIG. 1) or a network node (e.g., the network node 133 in FIG. 1). Further, the first radio node 600b may be capable of wireless communications with one or more radio nodes (e.g., the third radio node 121 and fourth radio node 123 in FIG. 1). In FIG. 6B, the first radio node 600b may implement various functional means, units, or modules (e.g., via the processing circuit(s) 601a in FIG. 6A or via software code). These functional means, units, or modules (e.g., for implementing the method of FIGS. 4, 7, 10, 13-23) may include a first channel information obtaining unit or module 611b for obtaining first channel information that characterizes a communication channel between a third radio node and the first radio node 600b in a first frequency band. Further, these functional means, units, or modules may include a first channel information sending unit or module 613b for sending, to the second radio node, the first channel information so as to allow the second radio node to use the first channel information for communication with the third radio node or a fourth radio node in a second frequency band. Further, the first radio node 600b and the second radio node may be co-located such as the first radio node 600b being geographically proximate the second radio node. In addition, these functional means, units, or modules may include a characterizing unit or module 615b for characterizing the communication channel between the first and third nodes in the first frequency band to obtain the first channel information. Also, these functional means, units, or modules may include a characterizing unit or module 617b for estimating or measuring a certain characteristic of the communication channel between the first and third nodes in the first frequency band to obtain the first channel information.

Figure 7:
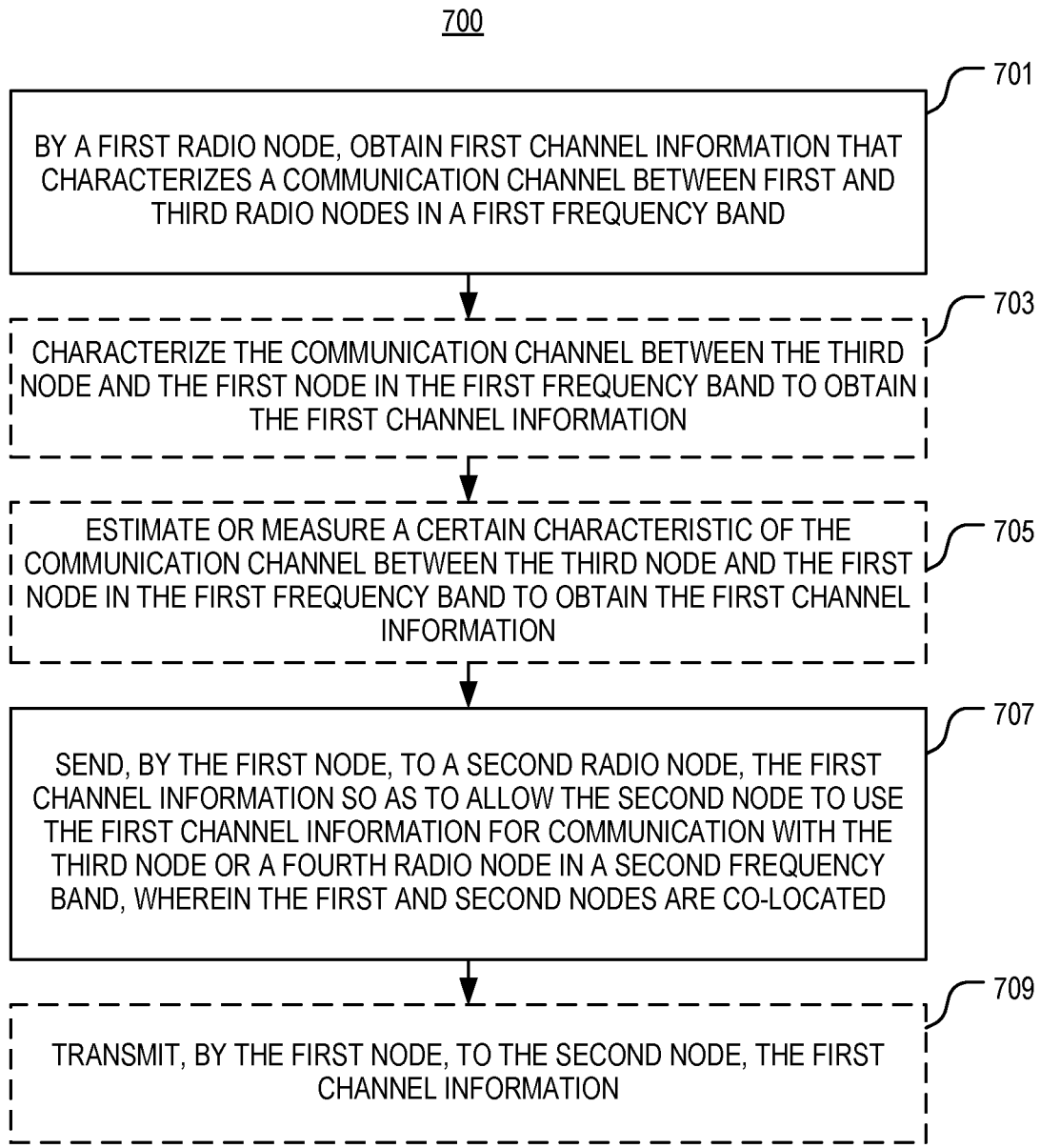
FIG. 7 illustrates another embodiment of a method performed by a first radio node for sharing channel information between first and second radio nodes that are co-located in accordance with various aspects as described herein.

FIG. 7 illustrates another embodiment of a method 700 performed by a first radio node for sharing channel information between the first node and a second radio node that are co-located in accordance with various aspects as described herein. In FIG. 7, the method 700 may start, for instance, at block 701, where it may include obtaining, by a first radio node, first channel information that characterizes a communication channel between a third radio node and the first node in a first frequency band. At block 703, the method 700 may include characterizing the communication channel between the third node and the first node in the first frequency band to obtain the first channel information. Further, at block 705, the method 700 may include estimating or measuring a certain characteristic of the communication channel between the third node and the first node in the first frequency band to obtain the first channel information. In addition, at block 707, the method 700 may include sending, by the first radio node, to the second radio node, the first channel information so as to allow the second radio node to use the first channel information for communication with the third radio node or a fourth radio node in a second frequency band. Also, the first and second radio nodes may be geographically co-located. Finally, at block 709, the method 700 may include transmitting, by the first node, to the second node, the first channel information.

Figure 8:
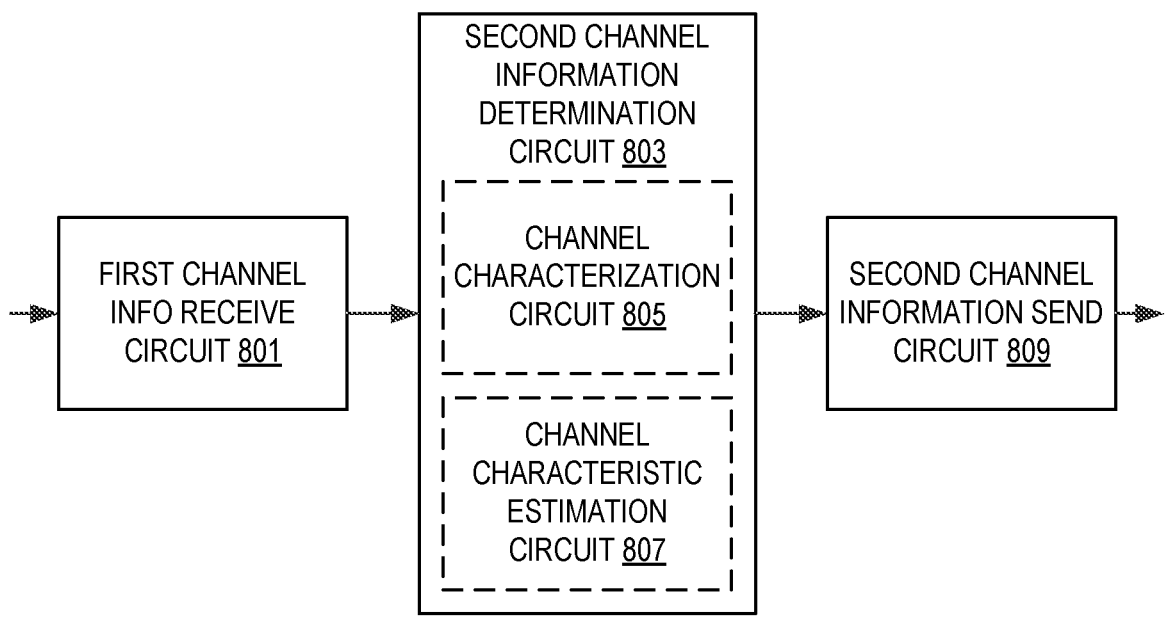
FIG. 8 illustrates one embodiment of a network node in accordance with various aspects as described herein.

FIG. 8 illustrates one embodiment of a network node 800 in accordance with various aspects as described herein. In FIG. 8, the network node 800 includes a first channel information receive circuit 801 configured to receive, from the first node, first channel information that characterizes a communication channel between the first node and a third radio node in a first frequency band. Further, the network node 800 includes a second channel information determination circuit 803 configured to determine second channel information that characterizes a communication channel between the third node or a fourth radio node and the second node in the second frequency band based on the first channel information. The determination circuit 803 may include a channel characterization circuit 805 configured to characterize the communication channel between the third or fourth node and the second node in the second frequency band based on the first channel information to obtain the second channel information. In addition, the determination circuit 803 may include a channel characteristic estimation circuit 807 configured to estimate a value of a certain characteristic of the communication channel between the third or fourth node and the second node in the second frequency band based on a value of the certain characteristic of the communication channel between the first and third nodes in the first frequency band as indicated by the first channel information to obtain the second channel information. Finally, the network node 800 includes a second channel information send circuit 809 configured to send, to the second node, the second channel information so as to allow the second node to use the second channel information for communication with the third or fourth node in the second frequency band.

Figure 9A:
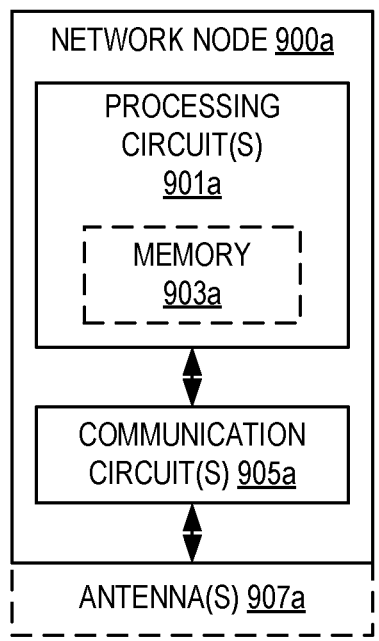
FIGS. 9A-B illustrate other embodiments of a network node in accordance with various aspects as described herein.
Figure 9B:
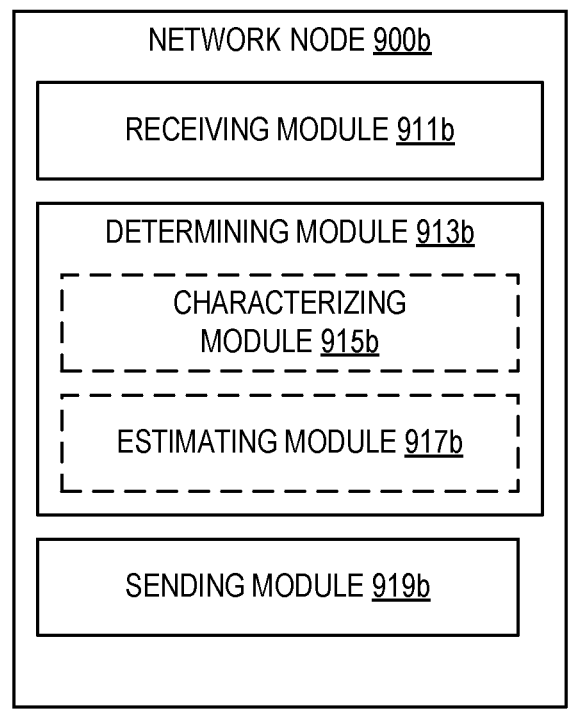

FIGS. 9A-B illustrate other embodiments of a network node 900a-b in accordance with various aspects as described herein. In FIG. 9A, the network node 900a (e.g., the network node 133 in FIG. 1) may include processing circuit(s) 901a, communications circuit(s) 905a, antenna(s) 907a, the like, or any combination thereof. The communication circuit(s) 905a may be configured to transmit or receive information to or from one or more network nodes or radio nodes via any wired or wireless communication technology. Further, the communication circuit(s) 905a may allow for interfacing to a wired or wireless communication network (e.g., the network 131 in FIG. 1) such as a core network, a local-area network (LAN), a wide-area network (WAN), a computer network, a wireless network, a telecommunications network, another like network or any combination thereof. For wireless communications, the one or more antennas 907a that are either internal or external to the network node 900a may be used. The processing circuit(s) 901a may be configured to perform processing as described herein (e.g., the method of FIG. 10) such as by executing program instructions stored in memory 903a. The processing circuit(s) 901a in this regard may implement certain functional means, units, or modules.

In FIG. 9B, the network node 900b may be capable of wired or wireless communications with the first and second radio nodes (e.g., the first and second radio nodes 101 and 111 in FIG. 1) such as via a wired or wireless network (e.g., the network 131 in FIG. 1). In FIG. 9B, the network node 900b may implement various functional means, units, or modules (e.g., via the processing circuit(s) 901a in FIG. 9A or via software code). These functional means, units, or modules (e.g., for implementing the method of FIG. 10) may include a receiving unit or module 911b for receiving, from the first radio node, first channel information that characterizes a communication channel between the first radio node and a third radio node in a first frequency band. Further, these functional means, units, or modules may include a determining unit or module 913b for determining second channel information that characterizes a communication channel between the third radio node or a fourth radio node and the second radio node in the second frequency band based on the first channel information. The determining unit or module 913b may include a characterizing module 915b for characterizing the communication channel between the third or fourth node and the second node in the second frequency band based on the first channel information. Further, the determining unit or module 913b may include an estimating module 919b for estimating a value of a certain characteristic of the communication channel between the third or fourth node and the second node in the second frequency band based on a value of the certain characteristic of the communication channel between the first and third nodes in the first frequency band as indicated by the first channel information. Also, these functional means, units, or modules may include a sending unit or module 919b for sending, to the second radio node, the second channel information so as to allow the second node to use the second channel information for communication with the third radio node or the fourth radio node in the second frequency band.

FIG. 10 illustrates one embodiment of a method 1000 performed by a network node for sharing channel information between first and second radio nodes that are co-located in accordance with various aspects as described herein. In FIG. 10, the method 1000 may start, for instance, at block 1001 where it may include receiving, by the network node, from the first node, first channel information that characterizes a communication channel between the first node and a third radio node in a first frequency band. Further, the first and second radio nodes may be co-located. At block 1003, the method 1000 may include determining second channel information that characterizes a communication channel between the third node or a fourth radio node and the second node in the second frequency band based on the first channel information. At block 1005, the method 1000 may include characterizing the communication channel between the third node or the fourth node and the second node in the second frequency band based on the first channel information to obtain the second channel information. At block 1007, the method 1000 may include estimating a value of a certain characteristic of the communication channel between the third node or the fourth node and the second node in the second frequency band based on a value of the certain characteristic of the communication channel between the third node and the first node in the first frequency band, as indicated by the first channel information, to obtain the second channel information. At block 1009, the method 1000 may include sending, from the network node, to the second node, the second channel information so as to allow the second node to use the second channel information for communication with the third node or the fourth node in the second frequency band.

ADDITIONAL DESCRIPTION

The basic concept described by this disclosure is to communicate channel-related information between radio access network systems with co-located transmission/reception points working on separate frequency bands and utilize this information to improve the communication in either or both frequency bands. The information may be communicated directly or via an intermediate (physical or logical) node.

Figure 11:
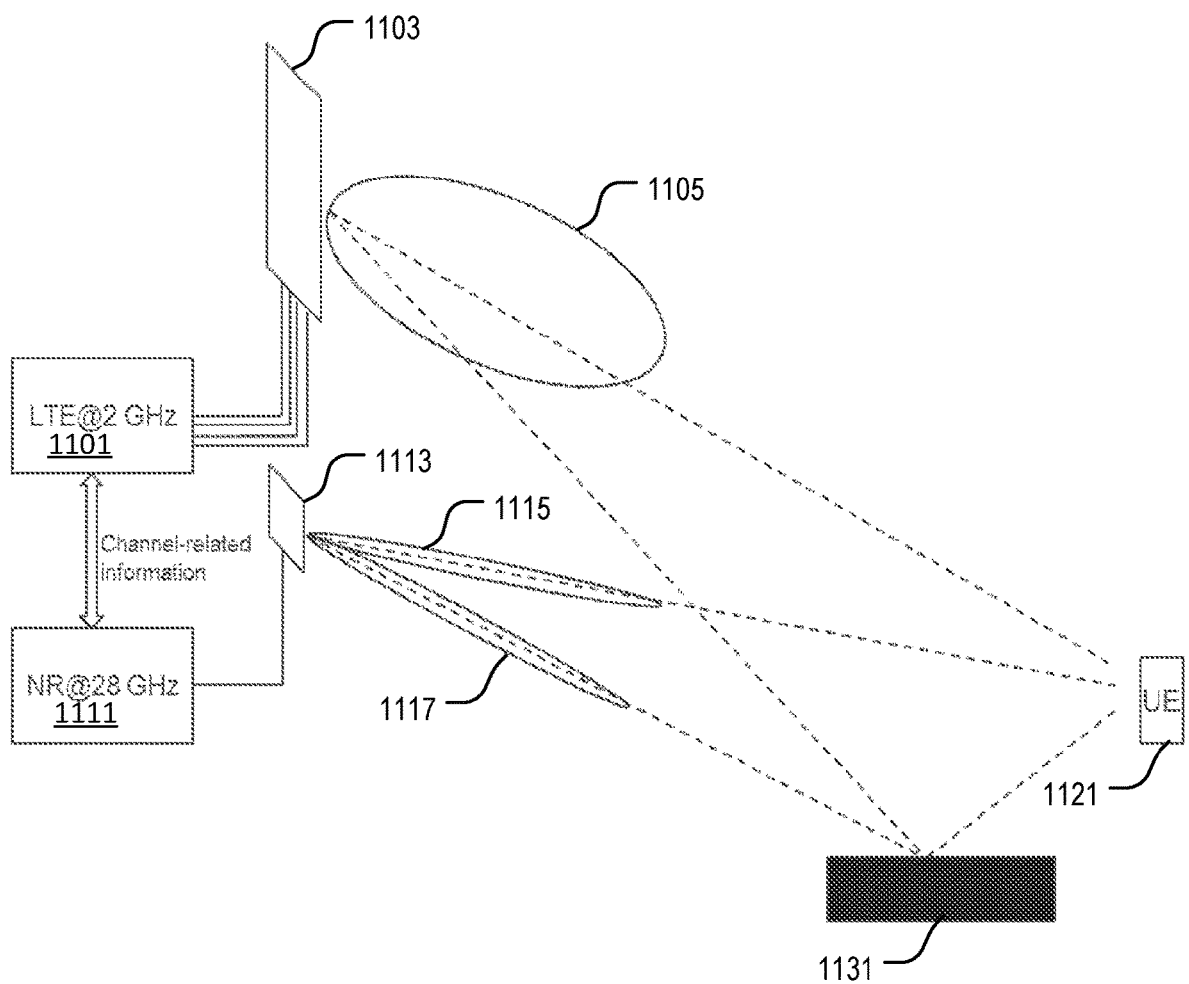
FIG. 11 illustrates another embodiment of a system for sharing channel information between co-located radio nodes in accordance with various aspects as described herein.

Radio channel-related information may be used to:
Improve speed and efficiency of initial access and beam searching or tracking;
Improve CSI quality to enhance gains with advanced antenna processing such as beamforming and MU-MIMO;
Provide early warning of blocking events such that beam or cell handovers may be initiated in time to avoid service disruption;
Enable or improve calibration of antenna arrays which would otherwise require costly hardware solutions;
Improve speed of sync (re-)establishment;
Provide more robust channel estimation;
Reduce overhead due to CSI reporting and reference symbol transmission;
Determine cyclic prefix settings to improve robustness and minimize overhead;
Improve link adaptation resulting in better user experience, e.g., improving initial parameter settings for link adaptation to reduce the time to reach the full link performance; and
Extend coverage and utilization of high frequency access The basic concept of this disclosure is illustrated by FIG. 11. In this figure, there are two co-sited radio units 1101, 1111 communicating with the same UE 1121 using different frequency bands. In FIG. 11, these are exemplified with an LTE radio unit 1101 at 2 GHz and an NR radio unit 1111 at 28 GHz, though the subject matter of this disclosure is applicable to any combination of frequency bands and standards in the radio units 1101, 1111. Each radio unit 1101, 1111 is connected to one or several antennas 1103, 1113. The antennas may be configured in an array. In some cases, these are separate physical arrays as in the example but in others the radio units are connected using e.g., splitter/combiners and filters to a common multiband (array) antenna. The two radio units 1101, 1111 may possibly utilize the radio channel in very different ways using different communication technologies or multi-antenna techniques. This is exemplified in FIG. 11 with a single wide beam 1105 for the LTE radio unit and two narrow beams 1115, 1117 for the NR radio unit.

In the context of this disclosure, "co-sited" means that the antennas are deployed sufficiently close to each other such that the channel characteristics to be shared are correlated between the two sets of antennas. This occurs typically when the geometry of the physical environment as observed from the respective antenna arrays is essentially identical. For practical purposes, this is the case if the antennas are on the same mast or pole, or within a few meters of each other on the same building wall or roof. Indoor deployments can be considered as co-sited if the antenna arrays are within the same part of a room (e.g., the same interior wall or in the vicinity of each other on the same ceiling). Another case of "co-sited" is when the antennas are attached to or contained within the same wireless device.

Whenever the condition of co-sited antennas is fulfilled, it is known from recent research that the radio channel will have similar characteristics. This is illustrated in FIG. 11 by two propagation paths, common for both frequency bands: a direct path to the UE and a path reflected from an object 1131 in the environment.

The basic concept of the present disclosure is to share estimates of channel characteristics between the systems with co-sited radio units, working in different frequency bands, as indicated by the arrow between the two radio units 1101, 1111 in FIG. 11. The information of the channel characteristics in a different frequency band is subsequently used to improve the communication between a certain radio unit and a UE. The communication can be over a proprietary or standardized interface directly between the radio units or via a third node, such as the network node 133, and may be uni or bi-directional. The communication may also be within a multi-standard or multi-frequency access radio unit.

Examples of channel characteristic information fall into the following categories with corresponding examples:
- Directions of departure/arrival (mean DoD/DoA, angular spread, antenna cross-correlation, precoder index, beam shape or beam index, power per beam, . . . )
- Channel time evolution (Doppler shift, Doppler spread, coherence time, level crossing rate, fading depth)
- Propagation delay time (mean delay, delay spread, coherence bandwidth, timing advance, roundtrip time, . . . )
- Channel quality (path loss, received power, channel rank indicator, modulation and coding scheme, singular value spread, singular value ratio, condition number, coherence time, etc.)

Some of these parameters may already be estimated as part of established procedures in state of the art communication systems and are thus available internally in a specific radio unit.

Several of these parameters are correlated; if one is available for one frequency band, it can be shared to estimate another parameter for the other frequency band.

This disclosure is exemplified with a number of embodiments below.

Beam Finding for Random Access Embodiment(s)

This embodiment relates to the establishment of initial access for a radio unit using a frequency where beamforming is required to achieve a sufficient link budget. An example of this can be an NR system at mmW. Using prior art, the direction of the UE is unknown and the radio unit would have to sweep a beam over time or frequency resources which may lead to a time delay before the connection can be established or induce additional overhead.

Using the present disclosure, the direction of the UE is estimated on a different, typically lower, frequency band where the link budget is more favorable. The radio unit operating at the lower frequency band is usually not equipped with as many antenna elements as the one at the higher band, but as long as it has at least two spatially separated antenna elements, it will have access to more or less coarse DoA estimates. This estimate could come in the form of an angle or in, e.g., a beam index pointing to the strongest beam. It can also be in the form of a precoder. By communicating this information to the high frequency radio unit, this unit may modify its search strategy, e.g., by starting in the communicated direction which is most likely the best choices. Due to the similarity of the directions of arrival between different frequency bands, it is likely that this can reduce the time to establish the connection.

Further, the likelihood of maximum power beam direction in one band, given the angle power distribution in another band, can be used to provide a favorable beam finding order in the one band. The order should here be starting with the highest likelihood continuing with the second highest and so forth until a suitable direction is found.

CSI Embodiment(s)

Many communication technologies, especially those related to multi-antenna transmission, are benefited by accurate channel state information (CSI) at the transmitter. This is particularly true for advanced schemes such as eigen-beamforming or MU-MIMO. Such CSI for, e.g., the downlink may typically be provided by feedback CSI reporting by the UE. However, to enable the potential gains of some of the advanced multi-antenna schemes, very accurate and detailed CSI is needed, which may not be readily available using existing standards such as LTE and correspondingly small antenna arrays.

In one embodiment of this disclosure, DoAs are estimated by the high frequency radio unit and subsequently communicated to a low frequency radio unit for improving the CSI information at the low frequency. Typically, the high frequency will utilize a larger antenna array providing better spatial resolution. In one variant of the embodiment, the low frequency radio unit uses DoAs directly to select beam shapes for multi-antenna communication at the lower frequency bands. This can, for example, be done with open-loop precoding with transmission mode 9 or 10 in LTE, enabling a finer granularity than with closed-loop precoding. In another closed-loop precoding variant, DoAs are used to design precoders for CSI-RS (reference symbols), which are subsequently used by the UE to report CSI. In either case, the CSI at the lower frequency band is improved, enabling better gains with multi-antenna transmissions.

Blocking Detection Embodiment(s)

Figure 12A:
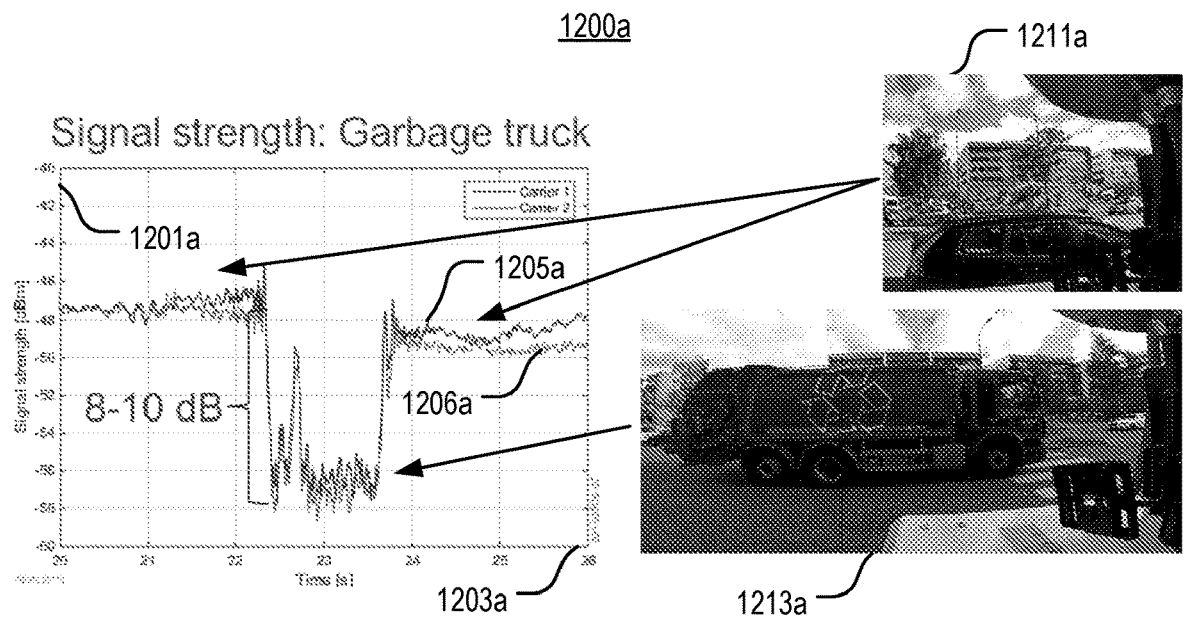
FIGS. 12A-B illustrate the effects on signal strength from blocking due to nearby objects for various frequency bands.
Figure 12B:
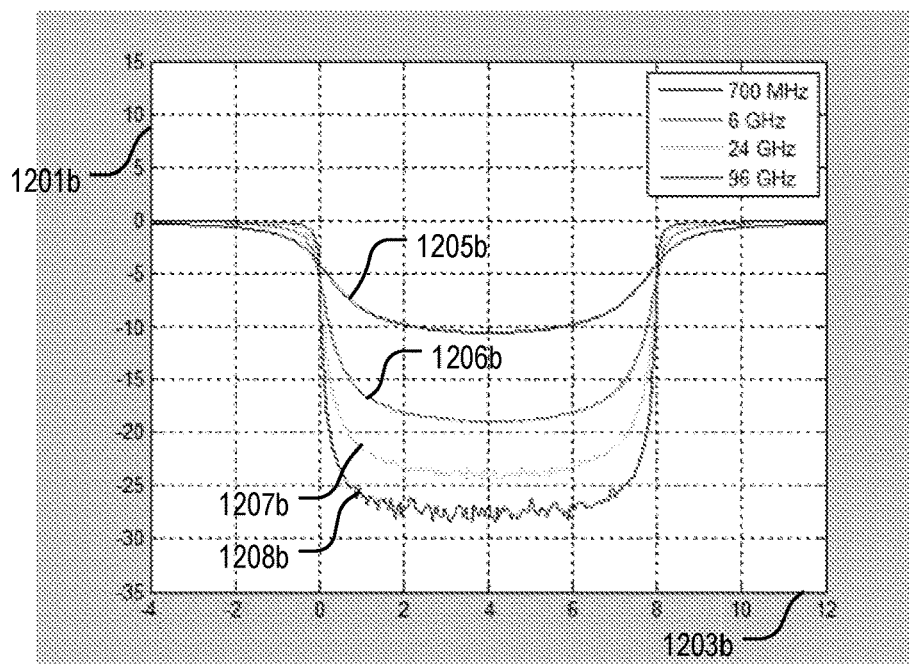

The presence of objects near the UE may cause blocking of some propagation paths. The impact of such blocking is stronger at higher frequencies—"shadows are darker" and transitions from unblocked to blocked states become more rapid. For systems relying on beamforming with high gain narrow beams, this presents a challenge, particularly when the UE or the environment is in motion. Whenever a propagation path is blocked, a rapid handover to beam pointing along a different propagation path may be required, or even a handover to a different transmission point. FIGS. 12A-B illustrate examples 1200a,b of the effects on signal strength from blocking due to nearby objects for various frequency bands. The ordinate axis 1201a represents signal strength in dBm while the abscissa axis 1203a represents time in seconds. In FIG. 12A, a truck in an intersection, as illustrated by image 1213a, results in an 8-10 dB degradation in signal strength for carriers 1205a, 1206a relative to a car in an intersection, as illustrated by image 1211a. In FIG. 12B, the effects on signal strength from blocking due to a nearby object are displayed for frequencies 700 MHz, 6 GHz, 24 GHz, and 96 GHz, respectively represented by references 1205b-1208b. The ordinate axis 1201b represents signal strength in dB while the abscissa axis 1203a represents time in seconds. As shown, the amount of signal strength degradation increases with frequency.

In one embodiment of the present disclosure, the occurrence of a blocking event is detected on one of the frequency bands. This could be the high frequency band where the blocking may be faster and more deep, or it could be the low frequency band where the first impact of blocking starts earlier due to the longer wavelength. This occurrence is communicated to the other frequency radio unit, where the handover can be initialized earlier than using the prior art solutions. Similarly, one of the radio units may more rapidly determine a new beam or cell, e.g., through a better link budget and a smaller candidate set to search through. This may be communicated back to the other frequency radio unit such that this can more rapidly complete a handover as well.

Beam Finding and Beam Tracking Embodiment(s)

When performing beam search as part of initial access and mobility, it is known in the art that it can be beneficial to utilize historical information of which beams are more commonly used. This information can be used to determine search patterns, etc.

In one embodiment of this disclosure, beam usage statistics are shared between two co-sited radio units operating in different frequency bands. This provides better statistics and more robust operation, particularly when such statistics are not fully reliable (e.g., due to a poor link budget at the higher frequency). Further, these statistics may be used for any of the applications described herein such as blocking detection, beam forming, beam searching and tracking, and estimating a direction of arrival or departure (DoA/DoD). Also, these statistics may be collected for any communication channel between the first or second node and the third or fourth node such as the first, second, or third communication channels.

Antenna Array Calibration Embodiment(s)

Coherent multi-antenna transmission techniques may require antenna array calibration, which typically involves costly hardware to determine the phase offsets over the antenna array. In case of an uncalibrated array that has already been deployed, there doesn't seem to be any tractable solutions for calibration in the prior art.

In one embodiment of this disclosure, a direction of arrival for a certain UE is measured on one frequency band. The radio unit and antenna array may be calibrated on this frequency band, or it could utilize a non-coherent grid of beams. This direction of arrival is communicated to a radio unit on another frequency band, which can subsequently determine the expected phase offsets over its array using this information. These expected phase offsets can be compared with measured phase shifts on, e.g., an uplink transmission from the same UE. Calibration coefficients may then be determined from the difference between the expected and measured phase values. By applying these coefficients, e.g., through software implementation on the base-band signals, the antenna array can be calibrated. One benefit of this approach is that calibration may be introduced as a software upgrade of an already deployed radio unit.

Synchronization (Re-)Establishment Embodiment(s)

As part of establishing synchronization between a radio unit and a UE, timing advance (TA) must be estimated. Since this is part of initial access, there is typically no prior information on the timing so a search has to be made, which may consume time and resources.

In one embodiment, the timing information at one frequency band is communicated to a radio unit operating at another frequency band. Timing information may be mean delay, timing advance or round trip time. This could be, for instance, an LTE @ 2 GHz radio unit providing ubiquitous coverage that shares timing information with a co-sited NR @ mmW radio unit that provides spottier coverage. As the timing advance is dependent on the propagation time over the wireless channel, the NR radio unit may use the same TA, or alternatively, adapt its search procedure to, e.g., start with this value. The timing information may also be provided to the UE as a starting search position for synchronization signal. The benefit is that synchronization establishment/re-establishment can be faster for NR if there is an active LTE connection.

Channel Estimation Embodiment(s)

Channel estimation is typically based on known reference signals that are transmitted with a certain granularity in time and/or frequency. It is known that averaging the channel estimates based on appropriate filters is beneficial for increased robustness of the estimates, particularly in low SNR situations. Typically, averaging may be performed within the coherence time or coherence bandwidth of the channel.

In one embodiment of this disclosure, the coherence properties in time and or frequency (e.g., directly characterized based on channel estimates or using derived measures such as filter settings) is shared between different frequency bands. This allows more robust channel estimation, particularly when the channel coherence time/bandwidth is difficult to estimate such as in the very low SNR range.

Configuration of Radio Bearer and CSI Reporting Embodiment(s)

The optimal density of reference signals for, e.g., channel estimation and CSI reporting and the CSI reporting granularity are also impacted by the time and frequency correlation of the channel. E.g., for a stationary UE experiencing a frequency-flat channel there is a lot of unnecessary overhead if reference signals such as DMRS or CSI-RS are transmitted with a density to support high speed or highly frequency-selective channels. Similarly, if this UE is configured to report CSI information with high granularity in time and/or frequency, the reporting overhead is unnecessarily large.

In one embodiment of this disclosure, the coherence properties in time and or frequency (e.g., directly characterized based on channel estimates or using derived measures such as reference symbol granularity) is shared between different frequency bands. This is used by the radio unit to configure reference signal (DMRS, CSI-RS, etc.) granularity and/or the CSI reporting granularity. The benefit is less transmission and reporting overhead.

Cyclic Prefix Setting Embodiment(s)

Classical OFDM uses a cyclic prefix (CP) to provide protection against inter-symbol-interference due to, e.g., time dispersion in the radio channel. Higher CP values provide better protection but consume more overhead. In NR, a cell may be able to choose from multiple CP values. However, when deploying a NR access point radio unit, it can be difficult to determine an appropriate CP configuration.

In one embodiment of this disclosure, statistics of the time dispersion are gathered for an existing radio unit (e.g., LTE). These are used to determine a suitable CP for a co-sited radio unit (e.g., NR). The communication can either be directly between the radio units, or the configuration can be managed by a separate network node, e.g., in the operation center of the network. The collection of such statistics over many cells and the optimization of CP settings can be suitable for a self-organizing/optimizing network (SON)-like feature. The benefit is a more accurate CP setting, resulting in less overhead while at the same time providing more robustness against deployments suffering from large time dispersion. Also, variants of this embodiment may consider other parts of the OFDM numerology than the CP length (e.g., symbol length or subcarrier spacing).

Link Adaptation and Power Control Embodiment(s)

Link adaptation involves adjusting the transmission rank, modulation, and coding based on the current radio channel characteristics. Power control is used to transmit with sufficient power and limit interference. This is performed using various algorithms, which aim to converge towards an optimal rank, MCS, and power level. Typically, the algorithm starts from a conservative setting resulting in a low but robust initial bit rate. However, it can be the case that coverage is spottier on a higher frequency band resulting in frequent re-establishments of the transmission link. Also, in the case of high capacity links and small packet sizes, it can be the case that the algorithm is not able to converge before the packet has been transmitted. The result can be a lower experienced bit rate than what the channel really supports.

In one embodiment of this disclosure, channel quality estimates (e.g., directly characterized or indirectly using, e.g., RI and MCS for one of the frequency bands) are shared between frequency bands. These estimates are used to adjust the link adaptation algorithm, e.g., by setting a more aggressive starting point when the channel quality on the other frequency band is high. The benefit is a faster link adaptation resulting in an improved bit rate and user experience.

Also, less explicit channel characteristics can be shared and used for link adaptation. Singular value ratio or condition number can be used to determine transmission rank. Path loss and received power can be used to determine modulation and coding.

Inter Band Calibration Embodiment(s)

Though the propagation related characteristics between bands over a wide frequency range are expected to be highly correlated, there will be some differences. These differences may be estimated by comparing measured statistics for the different bands. Based on UE location in terms of GPS and/or multi-dimensional space of propagation-related parameters like path loss, power delay profile, roundtrip time, etc., a table of corresponding calibration values may be applied in order to further improve the performance of the subject matter of this disclosure.

Entities doing the estimation and/or communication of channel characteristics may be internal in the radio units or distributed in separate nodes. Similarly, the "decision-making" on how the second radio unit should be configured based on this information may also be executed in a separate node.

The sharing of channel-related information is in either raw or processed form between separate but co-sited base stations or baseband/radio units working on different frequency bands. This information can be communicated over proprietary or standardized interfaces. Further, the use of such information can improve various aspects of transmission and reception in a given frequency band.

Figure 13:
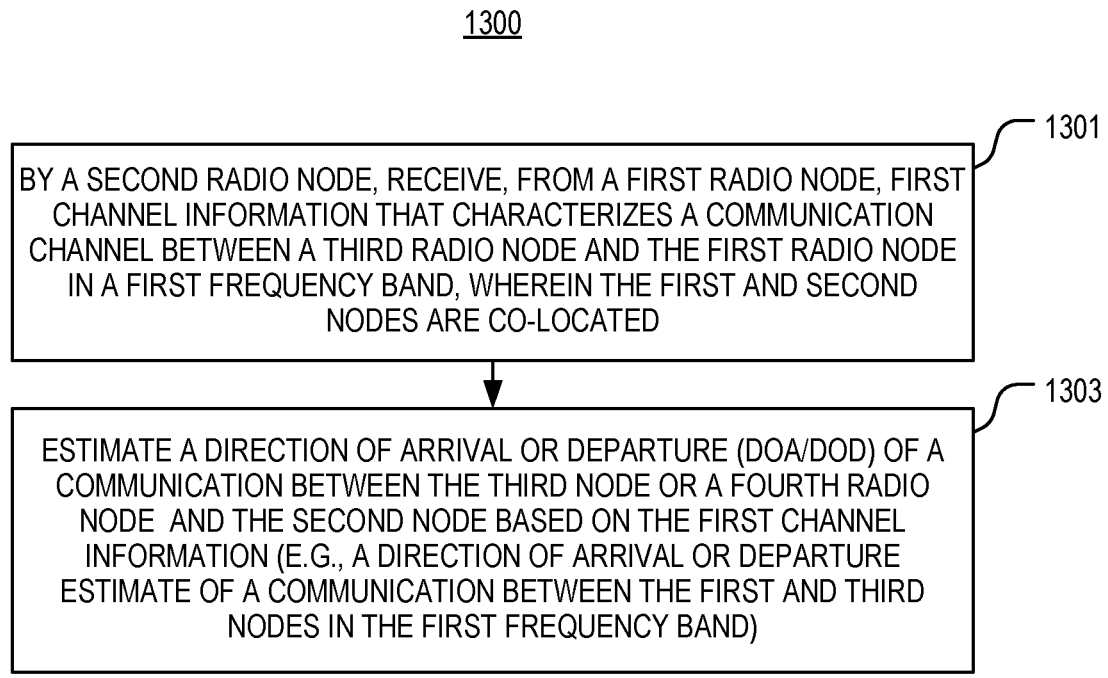
FIG. 13 illustrates one embodiment of a method performed by a second radio node of using channel information shared between co-located radio nodes operating in different frequency bands to estimate a direction of a transmission in accordance with various aspects as described herein.

FIG. 13 illustrates one embodiment of a method 1300 performed by a second radio node of using channel information shared between co-located radio nodes operating in different frequency bands to estimate a direction of a communication in accordance with various aspects as described herein. In FIG. 13, the method 1300 may start, for instance, at block 1301 where it includes receiving, from a first radio node, by a second radio node, first channel information that characterizes a communication channel between a third radio node and the first radio node in a first frequency band. Further, the first and second nodes are co-located. At block 1303, the method 1300 also includes estimating a direction of arrival or departure (DoA/DoD) of a communication between the third node or a fourth radio node and the second node based on the first channel information (e.g., a direction of arrival or departure estimate of a communication between the first and third nodes in the first frequency band). In one example, a communication may be a transmission, a reception, or both.

Figure 14:
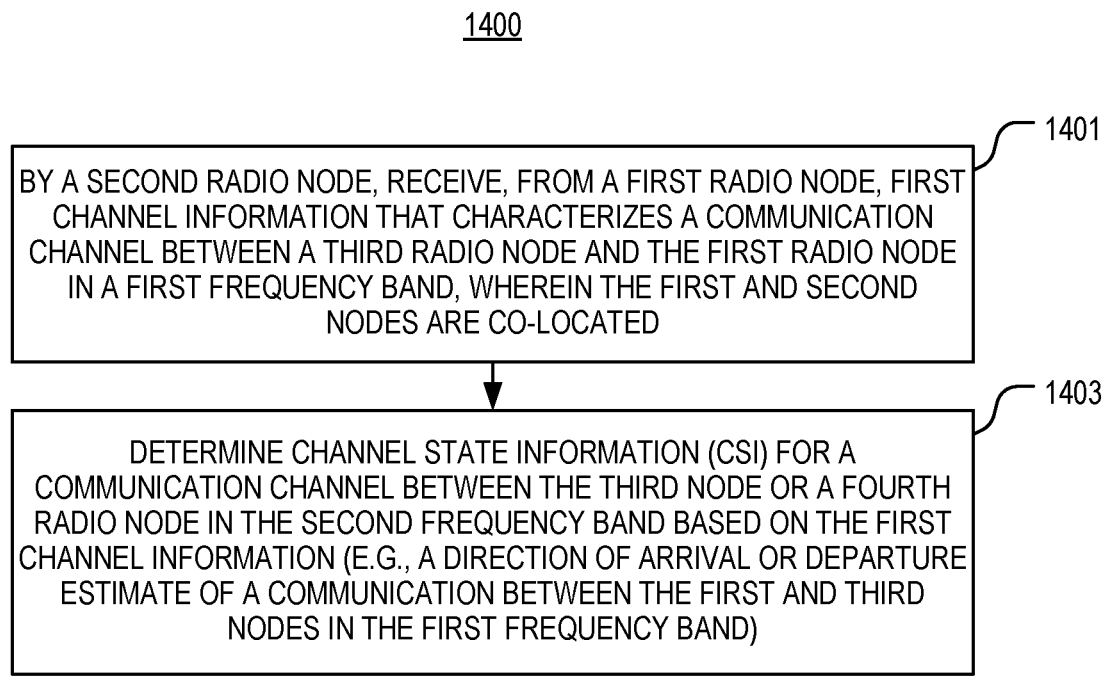
FIG. 14 illustrates one embodiment of a method performed by a second radio node of using channel information shared between co-located radio nodes operating in different frequency bands to determine channel state information in accordance with various aspects as described herein.

FIG. 14 illustrates one embodiment of a method 1400 performed by a second radio node of using channel information shared between co-located radio nodes operating in different frequency bands to determine channel state information in accordance with various aspects as described herein. In FIG. 14, the method 1400 may start, for instance, at block 1401 where it includes receiving, from a first radio node, by a second radio node, first channel information that characterizes a communication channel between a third radio node and the first radio node in a first frequency band. Further, the first and second nodes are co-located. At block 1403, the method 1400 also includes determining channel state information (CSI) for a communication channel between the third node or a fourth radio node in the second frequency band based on the first channel information (e.g., a direction of arrival or departure estimate of a communication between the first and third nodes in the first frequency band).

Figure 15A:
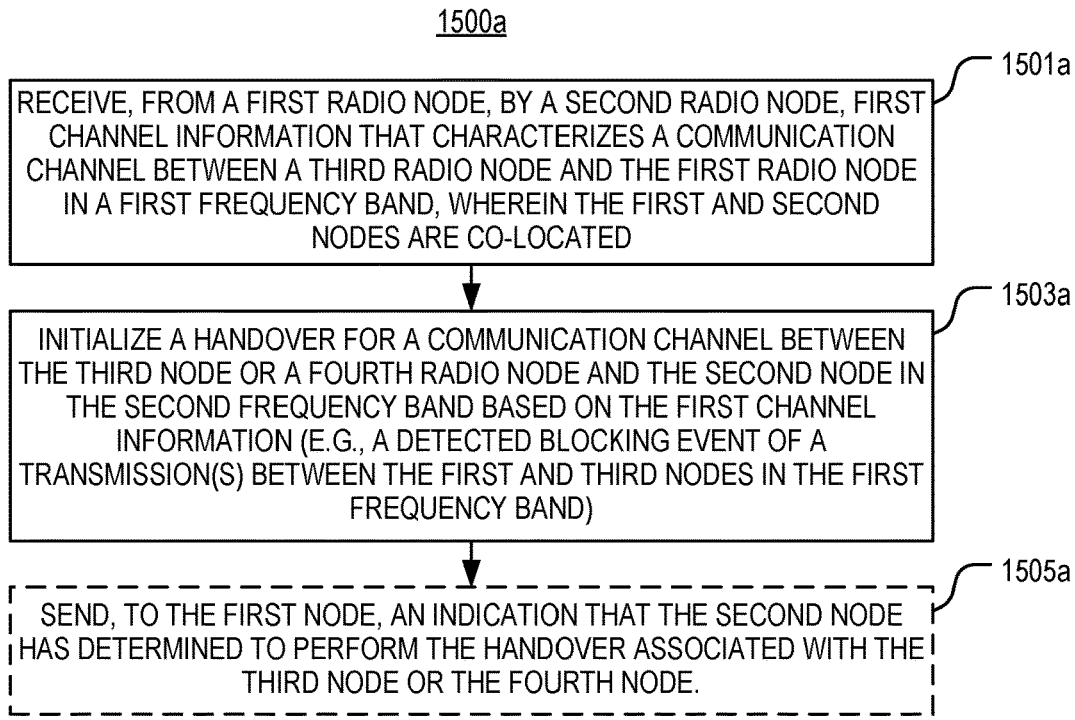
FIGS. 15A-B illustrate embodiments of methods performed by a second radio node of using channel information associated with a blocking event that is shared between co-located radio nodes operating in different frequency bands in accordance with various aspects as described herein.
Figure 15B:
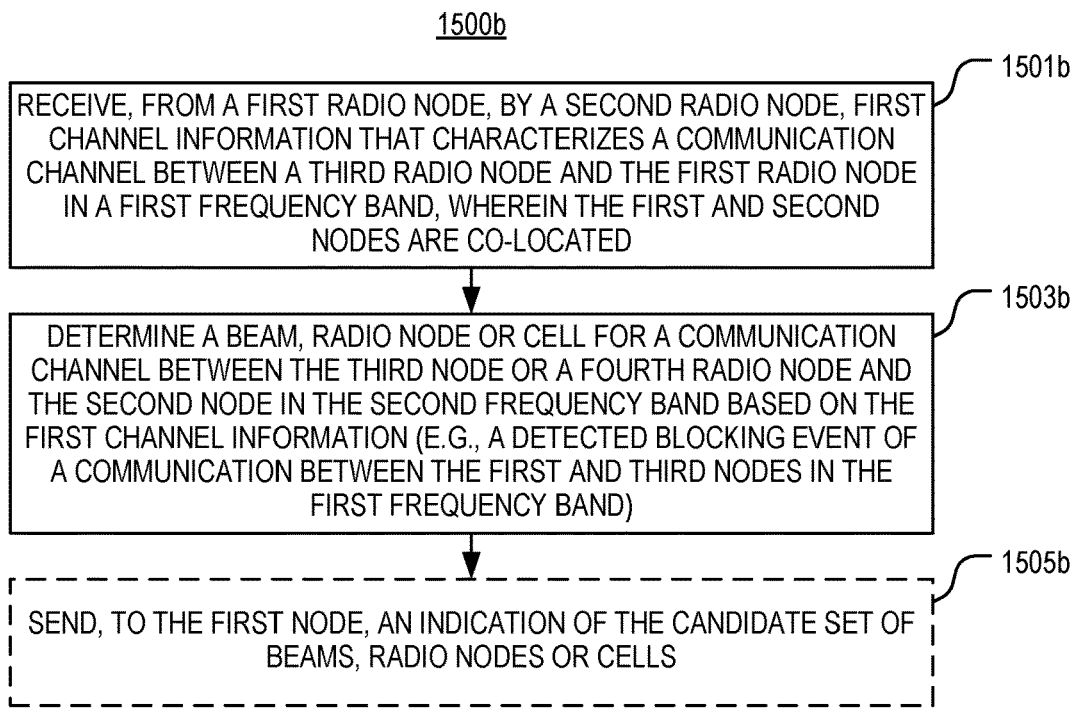

FIGS. 15A-B illustrate embodiments of methods 1500a,b performed by a second radio node of using channel information associated with a blocking event that is shared between co-located radio nodes operating in different frequency bands in accordance with various aspects as described herein. In FIG. 15A, the method 1500a may start, for instance, at block 1501a where it includes receiving, from a first radio node, by a second radio node, first channel information that characterizes a communication channel between a third radio node and the first radio node in a first frequency band. Further, the first and second nodes are co-located. At block 1503a, the method 1500a also includes initializing a handover for a communication channel between the third node or a fourth radio node and the second node in the second frequency band based on the first channel information (e.g., a detected blocking event of a communication between the first and third nodes in the first frequency band). At block 1505a, the method 1500a may include sending, to the first node, an indication that the second node has determined to perform the handover associated with the third node or the fourth node. In FIG. 15B, the method 1500b may start, for instance, at block 1501b where it includes receiving, from a first radio node, by a second radio node, first channel information that characterizes a communication channel between a third radio node and the first radio node in a first frequency band. Further, the first and second nodes are co-located. At block 1503b, the method 1500b also includes determining a beam, radio node or cell for a communication channel between the third node or a fourth radio node and the second node in the second frequency band based on the first channel information (e.g., a detected blocking event of a communication between the first and third nodes in the first frequency band). At block

Figure 16:
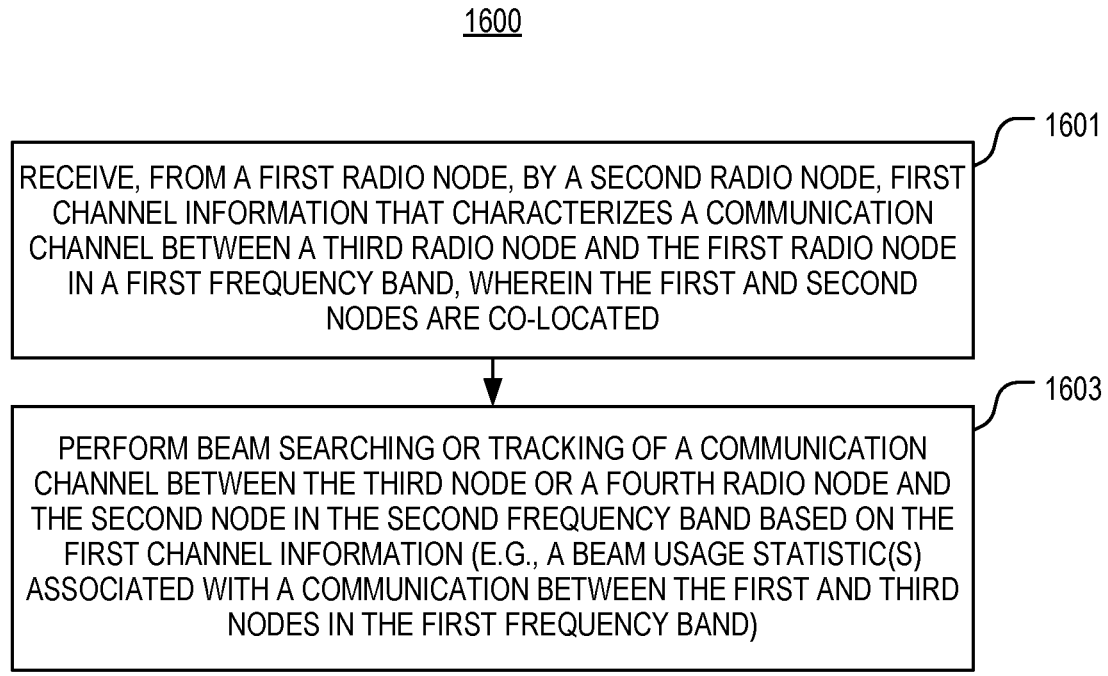
FIG. 16 illustrates one embodiment of a method performed by a second radio node of using channel information shared between co-located radio nodes operating in different frequency bands to perform beam searching or tracking of a communication in accordance with various aspects as described herein.

1505b, the method 1500b may include sending, to the first node, an indication of the candidate set of beams, radio nodes or cells FIG. 16 illustrates one embodiment of a method 1600 performed by a second radio node of using channel information shared between co-located radio nodes operating in different frequency bands to perform beam searching or tracking of a communication in accordance with various aspects as described herein. In FIG. 16, the method 1600 may start, for instance, at block 1601 where it includes receiving, from a first radio node, by a second radio node, first channel information that characterizes a communication channel between a third radio node and the first radio node in a first frequency band. Further, the first and second nodes are co-located. At block 1603, the method 1600 also includes performing beam searching or tracking of a communication channel between the third node or a fourth radio node and the second node in the second frequency band based on the first channel information (e.g., a beam usage statistic(s) associated with a communication between the first and third nodes in the first frequency band).

Figure 17A:
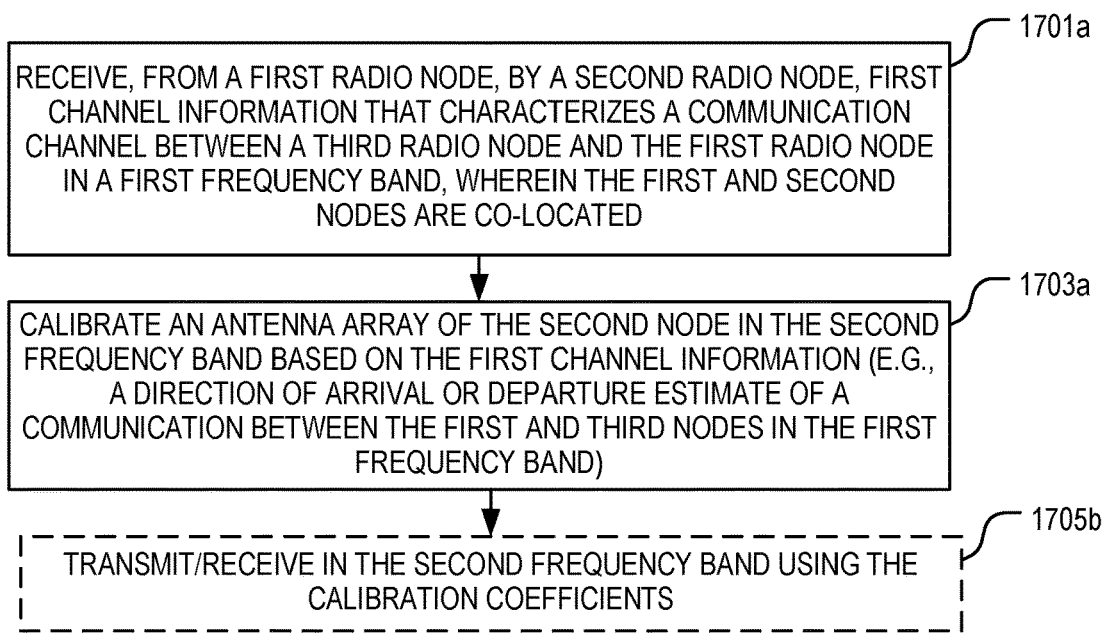
Figure 17B:
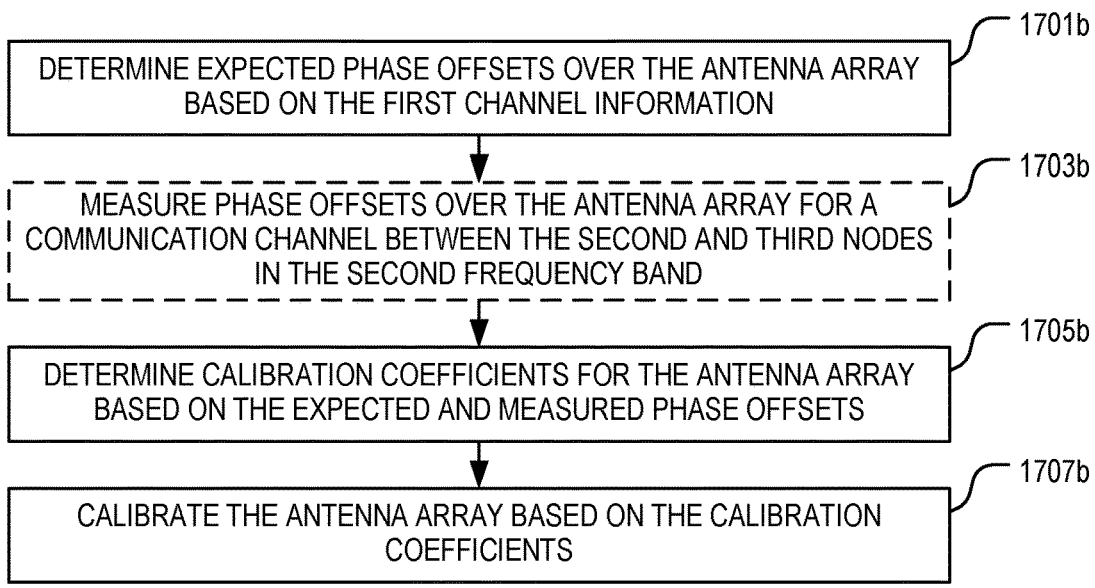

FIGS. 17A-C illustrate embodiments of a method 1700a,b performed by a second radio node of using channel information shared between co-located radio nodes operating in different frequency bands to calibrate an antenna array of the second node in a second frequency band in accordance with various aspects as described herein. In FIG. 17A, the method 1700a may start, for instance, at block 1701a where it includes receiving, from a first radio node, by the second node, first channel information that characterizes a communication channel between a third radio node and the first node in a first frequency band. Further, the first and second nodes are co-located. At block 1703a, the method 1700a also includes calibrating an antenna array of the second node in the second frequency band based on the first channel information (e.g., a direction of arrival or departure estimate of a communication between the first and third nodes in the first frequency band). At block 1705a, the method 1700a may include transmitting or receiving in the second frequency band using the calibration coefficients. The step 1703a of calibrating the antenna array may include the following steps of FIGS. 17B-C.

In FIG. 17B, the method 1700b may start, for instance, at block 1701b where it includes determining expected phase offsets over the antenna array based on the first channel information. At block 1703b, this step of determining 1701b may include measuring phase offsets over the antenna array for a communication channel between the third node and the second node in the second frequency band. At block 1705b, the method 1700b includes determining calibration coefficients for the antenna array based on the expected and measured phase offsets. At block 1707b, the method 1700b includes calibrating the antenna array based on the calibration coefficients.

In FIG. 17C, the method 1700c may start, for instance, at block 1701c where it includes determining a difference between a value of a propagation characteristic of a first communication channel used for communication between the first and third nodes in the first frequency band and a value of the propagation characteristic of a second communication channel used for communication between the third or fourth node and the second node in the second frequency band. At block 1703c, the method 1700c includes determining a calibration value related to the propagation characteristic representing the difference.

Figure 18:
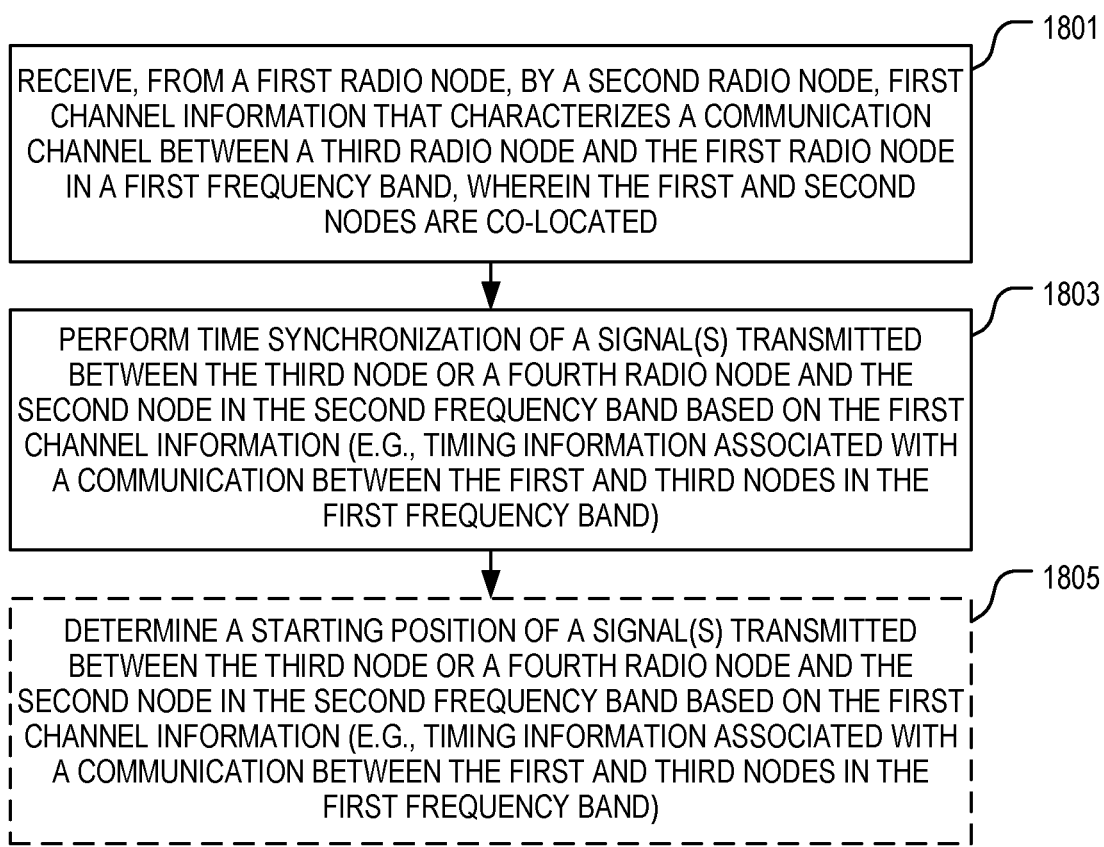
FIG. 18 illustrates one embodiment of a method performed by a second radio node of using channel information shared between co-located radio nodes operating in different frequency bands to perform time synchronization in accordance with various aspects as described herein.

FIG. 18 illustrates one embodiment of a method 1800 performed by a second radio node of using channel information shared between co-located radio nodes operating in different frequency bands to perform time synchronization in accordance with various aspects as described herein. In FIG. 18, the method 1800 may start, for instance, at block 1801 where it includes receiving, from a first radio node, by a second radio node, first channel information that characterizes a communication channel between a third radio node and the first radio node in a first frequency band. Further, the first and second nodes are co-located. At block 1803, the method 1800 also includes performing time synchronization of a signal(s) transmitted between the third node or a fourth radio node and the second node in the second frequency band based on the first channel information (e.g., timing information associated with communication between the first and third nodes in the first frequency band). The method 1800 of performing time synchronization may include determining a starting position of a signal(s) transmitted between the third node or a fourth radio node and the second node in the second frequency band based on the first channel information (e.g., timing information associated with a communication between the first and third nodes in the first frequency band), as represented by block 1805.

Figure 19:
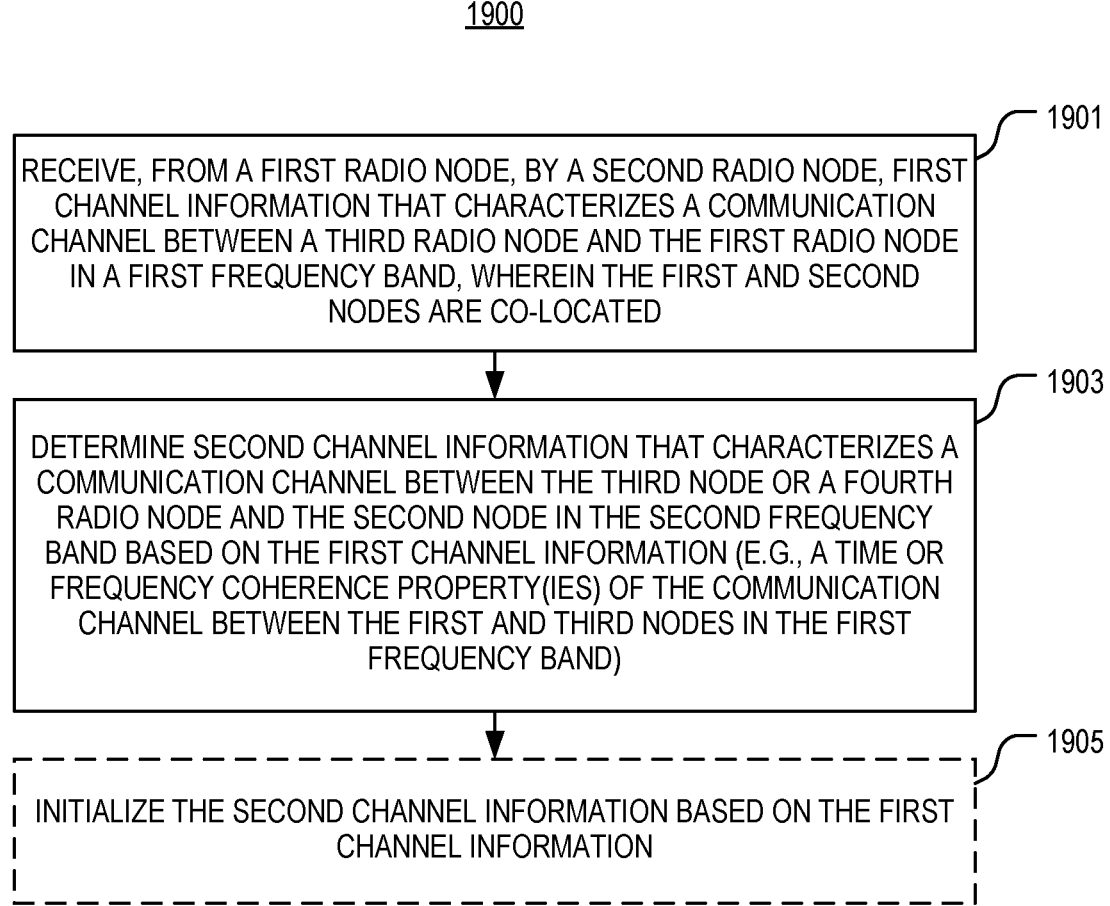
FIG. 19 illustrates one embodiment of a method performed by a second radio node of using channel information shared between co-located radio nodes operating in different frequency bands to determine channel information in accordance with various aspects as described herein.

FIG. 19 illustrates one embodiment of a method 1900 performed by a second radio node of using channel information shared between co-located radio nodes operating in different frequency bands to determine channel information in accordance with various aspects as described herein. In FIG. 19, the method 1900 may start, for instance, at block 1901 where it includes receiving, from a first radio node, by a second radio node, first channel information that characterizes a communication channel between a third radio node and the first radio node in a first frequency band. Further, the first and second nodes are co-located. At block 1903, the method 1900 also includes determining second channel information that characterizes a communication channel between the third node or a fourth radio node and the second node in the second frequency band based on the first channel information (e.g., a time or frequency coherence property (ies) of the communication channel between the first and third nodes in the first frequency band). At block 1905, the method 1900 may initialize the second channel information based on the first channel information.

Figure 20:
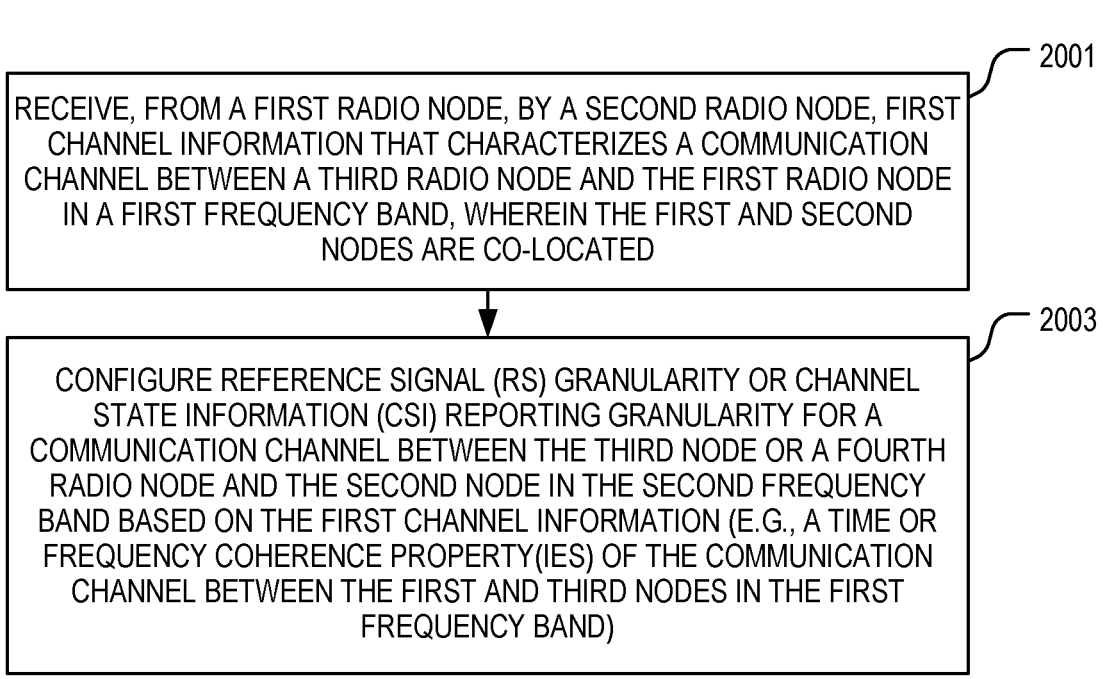
FIG. 20 illustrates one embodiment of a method performed by a second radio node of using channel information shared between co-located radio nodes operating in different frequency bands to configure reference signal granularity or CSI reporting granularity in accordance with various aspects as described herein.

FIG. 20 illustrates one embodiment of a method 2000 performed by a second radio node of using channel information shared between co-located radio nodes operating in different frequency bands to configure reference signal granularity or channel state information (CSI) reporting granularity in accordance with various aspects as described herein. In FIG. 20, the method 2000 may start, for instance, at block 2001 where it includes receiving, from a first radio node, by a second radio node, first channel information that characterizes a communication channel between a third radio node and the first radio node in a first frequency band. Further, the first and second nodes are co-located. At block 2003, the method 2000 also includes configuring reference signal granularity or CSI reporting granularity for a communication channel between the third node or a fourth radio node and the second node in the second frequency band based on the first channel information (e.g., a time or frequency coherence property(ies) of the communication channel between the first and third nodes in the first frequency band).

Figure 21:
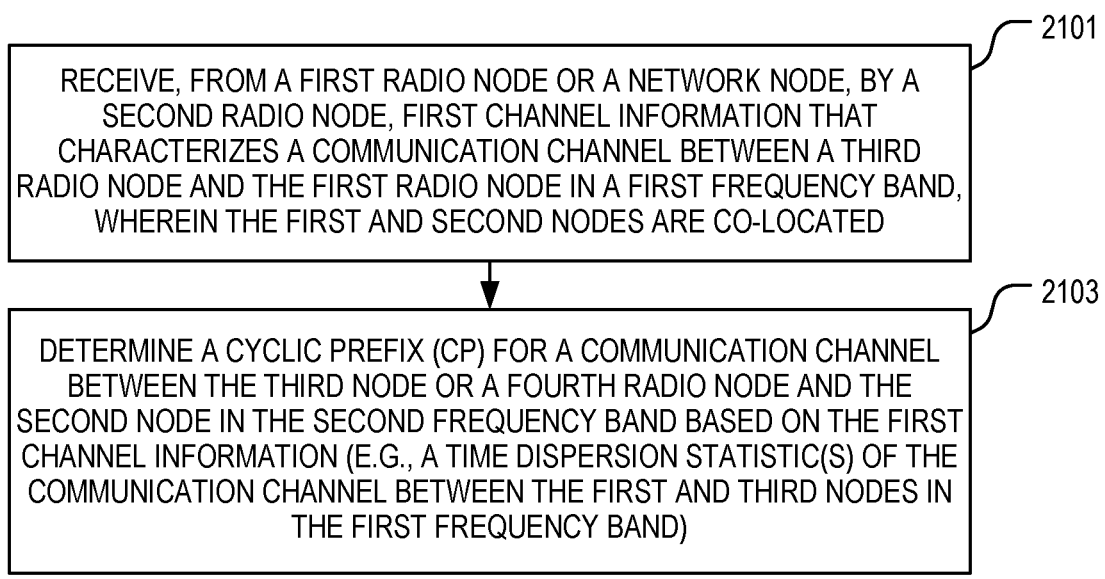
FIG. 21 illustrates one embodiment of a method performed by a second radio node of using channel information shared between co-located radio nodes operating in different frequency bands to determine a cyclic prefix (CP) in accordance with various aspects as described herein.

FIG. 21 illustrates one embodiment of a method 2100 performed by a second radio node of using channel information shared between co-located radio nodes operating in different frequency bands to determine a cyclic prefix (CP) in accordance with various aspects as described herein. In FIG. 21, the method 2100 may start, for instance, at block 2101 where it includes receiving, from a first radio node, by a second radio node, first channel information that characterizes a communication channel between a third radio node and the first radio node in a first frequency band. Further, the first and second nodes are co-located. At block 2103, the method 2100 also includes determining a CP for a communication channel between the third node or a fourth radio node and the second node in the second frequency band based on the first channel information (e.g., a time dispersion statistic(s) of the communication channel between the first and third nodes in the first frequency band).

Figure 22:
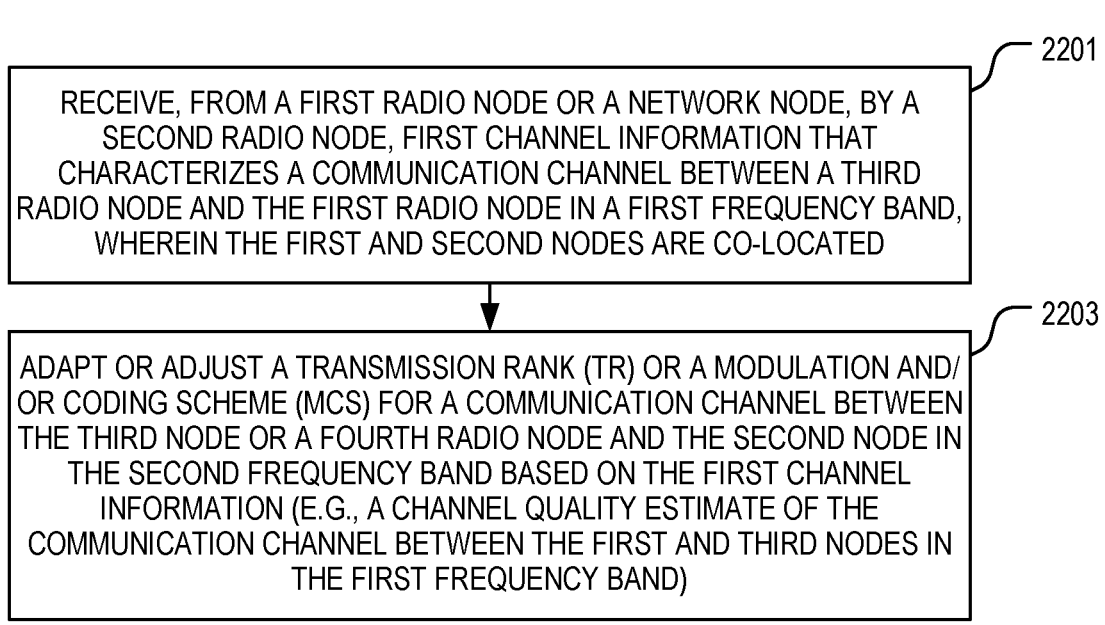
FIG. 22 illustrates one embodiment of a method performed by a second radio node of using channel information shared between co-located radio nodes operating in different frequency bands to adapt or adjust a transmission rank or a modulation or coding scheme in accordance with various aspects as described herein.

FIG. 22 illustrates one embodiment of a method 2200 performed by a second radio node of using channel information shared between co-located radio nodes operating in different frequency bands to adapt or adjust a transmission rank or a modulation or coding scheme in accordance with various aspects as described herein. In FIG. 22, the method 2200 may start, for instance, at block 2201 where it includes receiving, from a first radio node, by a second radio node, first channel information that characterizes a communication channel between a third radio node and the first radio node in a first frequency band. Further, the first and second nodes are co-located. At block 2203, the method 2200 also includes adapting or adjusting a transmission rank or a modulation or coding scheme for a communication channel between the third node or a fourth radio node and the second node in the second frequency band based on the first channel information (e.g., a channel quality estimate of the communication channel between the first and third nodes in the first frequency band).

Figure 23:
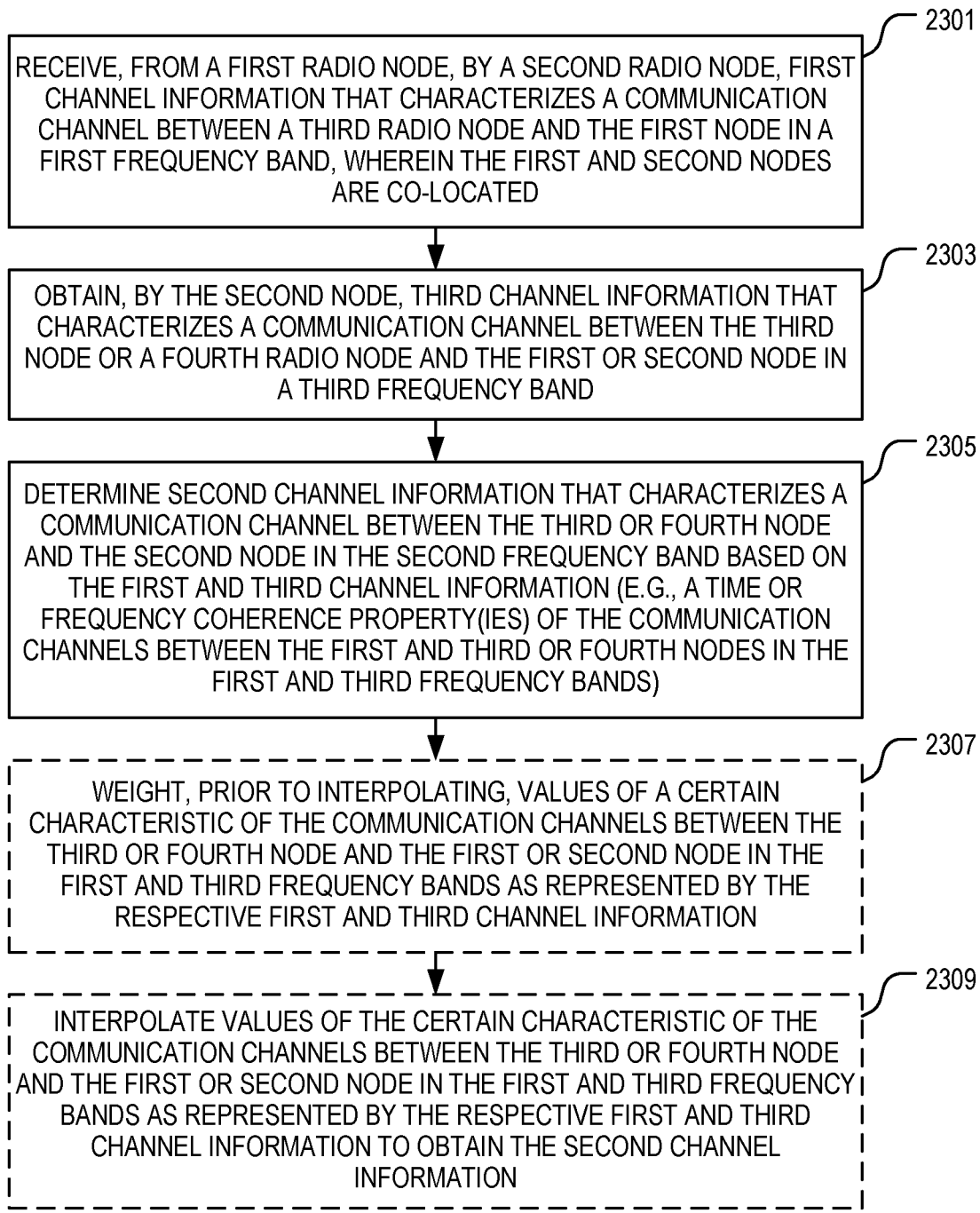
FIG. 23 illustrates another embodiment of a method performed by a second radio node of using channel information shared between co-located radio nodes operating in different frequency bands to determine channel information in accordance with various aspects as described herein.

FIG. 23 illustrates another embodiment of a method 2300 performed by a second radio node of using channel information shared between co-located radio nodes operating in different frequency bands to determine channel information in accordance with various aspects as described herein. In FIG. 23, the method 2300 includes receiving, from a first radio node, by a second radio node, first channel information that characterizes a communication channel between a third radio node and the first node in a first frequency band. Further, the first and second nodes are co-located. At block 2303, the method 2300 includes obtaining, by the second node, third channel information that characterizes a communication channel between the third node or a fourth radio node and the first or second node in a third frequency band. In one example, the third communication channel may be between the first and third node at the third frequency band. In another example, the third communication channel may be between the first and fourth nodes at the third frequency band, with the third and fourth nodes being co-located. In yet another example, the third communication channel may be between the second and third nodes at the third frequency band. In another example, the third communication channel may be between the second and fourth nodes at the third frequency band, with the third and fourth nodes being co-located.

In FIG. 23, at block 2305, the method 2300 includes determining second channel information that characterizes a communication channel between the third or fourth node and the second node in the second frequency band based on the first and third channel information (e.g., a time or frequency coherence property(ies) of the communication channels between the first and third or fourth nodes in the first and third frequency bands). At block 2307, the method 2300 may include weighting, prior to interpolating, values of a certain characteristic of the communication channels between the third or fourth node and the first or second node in the first and third frequency bands as represented by the respective first and third channel information. At block 2309, the method 2300 may include interpolating values of the certain characteristic of the communication channels between the third or fourth node and the first or second node in the first and third frequency bands as represented by the respective first and third channel information to obtain the second channel information.

ABBREVIATIONS

| Abbreviation | Explanation |
| --- | --- |
| CP | Cyclic Prefix |
| CSI | Channel State Information |
| CSI-RS | CSI Reference Signal |
| DMRS | Demodulation Reference Signal |
| DoA | Direction of Arrival |
| DoD | Direction of Departure |
| LTE | Long-Term Evolution |
| MCS | Modulation and Coding Scheme |
| MIMO | Multiple-Input Multiple-Output |
| MU-MIMO | Multi-User MIMO |
| NR | New Radio |
| OFDM | Orthogonal Frequency-Division Multiplexing |
| RI | Rank Indicator |
| SON | Self Organizing/Optimizing Network |
| UE | User Equipment |

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, performed by a second radio node, of sharing channel information between a first radio node and the second radio node that are co-located, the method comprising the second radio node:
    obtaining first channel information that characterizes a communication channel between a third radio node and the first radio node in a first frequency band, wherein the first channel information includes the direction of arrival or departure information related to the first frequency band; and
    using the first channel information for communication with the third node or a fourth radio node in a second frequency band;
    wherein the using the first channel information includes beamforming a signal for transmission to the third node or the fourth node in the second frequency band based on direction of arrival or departure information of a respective reception or transmission of a communication between the third node and the first radio node in the first frequency band.

2. The method of claim 1:
    wherein the using the first channel information includes estimating direction of arrival or departure information of a respective reception or transmission of a communication between the third node or the fourth node and the second radio node in the second frequency band based on direction of arrival or departure information of a respective reception or transmission of a communication between the third node and the first radio node in the first frequency band; and
    wherein the first channel information includes the direction of arrival or departure information related to the first frequency band.

3. The method of claim 1:
    wherein the using the first channel information includes beam searching or tracking a transmission between the third node or the fourth node and the second radio node in the second frequency band based on direction of arrival or departure information of a respective reception or transmission of a communication between the third node and the first radio node in the first frequency band; and
    wherein the first channel information includes the direction of arrival or departure information related to the first frequency band.

4. The method of claim 1:
    wherein the using the first channel information includes determining a channel estimate of a signal received from the third node or the fourth node in the second frequency band based on channel estimate information associated with a communication between the third node and the first radio node in the first frequency band; and
    wherein the first channel information includes the channel estimate information.

5. The method of claim 1, wherein the using the first channel information includes determining a direction of arrival or departure of a respective reception or transmission of a communication between the third node or the fourth node and the second radio node in the second frequency band responsive to determining that the first channel information indicates that the communication channel between the third node and the first radio node in the first frequency band is blocked.

6. The method of claim 1, wherein the using the first channel information includes determining to perform a handover associated with the third node or the fourth node responsive to determining that the first channel information indicates that the communication channel between the third node and the first radio node in the first frequency band is blocked.

7. The method of claim 1, wherein the using the first channel information includes determining a candidate set of beams, radio nodes, or cells that are capable of communications with the third node or the fourth node responsive to determining that the first channel information indicates that the communication channel between the third node and the first radio node in the first frequency band is blocked.

8. The method of claim 7, further comprising sending, to the first radio node, an indication of the candidate set of beams, radio nodes, or cells.

9. The method of claim 1:
wherein the using the first channel information includes beam searching or tracking a transmission between the third node or the fourth node and the second radio node in the second frequency band based on a beam usage statistic associated with reception or transmission of a communication between the third node and the first radio node in the first frequency band; and
wherein the first channel information includes the beam usage statistic.

10. The method of claim 1:
wherein the using the first channel information includes configuring a granularity of reference signals or channel state information (CSI) reporting for the communication with the third node or the fourth node in the second frequency band based on channel estimate information associated with communication between the third node and the first radio node in the first frequency band; and
wherein the first channel information includes the channel estimate information.

11. The method of claim 1:
wherein the using the first channel information includes adapting a transmission parameter for the communication with the third node or the fourth node in the second frequency band based on channel quality information related to a communication between the third node and the first radio node in the first frequency band; and
wherein the first channel information includes the channel quality information.

12. The method of claim 1, wherein the first channel information includes propagation delay information related to a communication between the third node and the first radio node in the first frequency band.

13. The method of claim 12, wherein the propagation delay information includes: mean propagation delay, delay spread, coherence bandwidth, timing advance, and/or roundtrip time.

14. A second radio node capable of sharing channel information with a first radio node that is co-located with the second radio node, the second radio node comprising:
processing circuitry;
memory containing instructions executable by the processing circuitry whereby the second radio node is operative to:
obtain first channel information that characterizes a communication channel between a third radio node and the first radio node in a first frequency band, wherein the first channel information includes the direction of arrival or departure information related to the first frequency band; and
use the first channel information for communication with the third node or a fourth radio node in a second frequency band;
wherein the using the first channel information includes beamforminq a signal for transmission to the third node or the fourth node in the second frequency band based on direction of arrival or departure information of a respective reception or transmission of a communication between the third node and the first radio node in the first frequency band.

15. A method, performed by a first radio node, of sharing channel information between the first radio node and a second radio node that are co-located, the method comprising the first radio node:
obtaining first channel information that characterizes a communication channel between a third radio node and the first radio node in a first frequency band, wherein the first channel information includes the direction of arrival or departure information related to the first frequency band; and
sending, to the second radio node, the first channel information so as to allow the second radio node to use the first channel information for communication with the third node or a fourth radio node in a second frequency band;
wherein the using the first channel information includes beamforminq a signal for transmission to the third node or the fourth node in the second frequency band based on direction of arrival or departure information of a respective reception or transmission of a communication between the third node and the first radio node in the first frequency band.

16. A first radio node capable of sharing channel information with a second radio node that is co-located with the first radio node, the first radio node comprising:
processing circuitry;
memory containing instructions executable by the processing circuitry whereby the first radio node is operative to:
obtain first channel information that characterizes a communication channel between a third radio node and the first radio node in a first frequency band, wherein the first channel information includes the direction of arrival or departure information related to the frequency band; and
send, to the second radio node, the first channel information so as to allow the second radio node to use the first channel information for communication with the third node or a fourth radio node in a second frequency band;
wherein the using the first channel information includes beamforming a signal for transmission to the third node or the fourth node in the second frequency band based on direction of arrival or departure information of a respective reception or transmission of a communication between the third node and the first radio node in the first frequency band.

* * * * *